US007084916B2

(12) United States Patent
Morimoto et al.

(10) Patent No.: US 7,084,916 B2
(45) Date of Patent: Aug. 1, 2006

(54) DIGITAL CAMERA HAVING AN IMPROVED USER INTERFACE

(75) Inventors: Yasuhiro Morimoto, Takatsuki (JP); Masahito Niikawa, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/453,999

(22) Filed: Jun. 4, 2003

(65) Prior Publication Data
US 2004/0179122 A1   Sep. 16, 2004

(30) Foreign Application Priority Data
Mar. 10, 2003 (JP) .......................... P2003-063957

(51) Int. Cl.
  *G02B 13/16*  (2006.01)
  *H04N 9/68*   (2006.01)
  *H04N 5/225*  (2006.01)
(52) U.S. Cl. .................. 348/333.01; 348/231.2; 348/207.99
(58) Field of Classification Search ............ 348/231.2, 348/333.01
  See application file for complete search history.

(56) References Cited
U.S. PATENT DOCUMENTS
6,215,523 B1 * 4/2001 Anderson ............... 348/333.05
6,310,648 B1 * 10/2001 Miller et al. ........... 348/333.11
6,441,854 B1 * 8/2002 Fellegara et al. ...... 348/333.01
6,512,548 B1 * 1/2003 Anderson .............. 348/333.05
6,519,003 B1 * 2/2003 Swayze ................. 348/333.01
6,816,189 B1 * 11/2004 Nagaoka et al. ......... 348/231.2
2002/0051066 A1 * 5/2002 Shibayama et al. ......... 348/232

FOREIGN PATENT DOCUMENTS
JP          2002-152567 A          5/2002

OTHER PUBLICATIONS
"CASIO Digital Camera EX-S2/EX-M2 User's Guide", pp. 1-117, (Sep. 2002).

* cited by examiner

*Primary Examiner*—David Ometz
*Assistant Examiner*—Nhan Tran
(74) *Attorney, Agent, or Firm*—Sidley Austin LLP

(57) ABSTRACT

The digital camera has the function of registering a captured image or the like in an album file and includes a display such as an LCD and a switch button (QV button) for switching a display image on the display. An image to be displayed on the display is changed in response to depression of a switch button among a live view image in a capturing mode, a reproduction image regarding a data file in a reproduction mode, and an album image regarding an album file in an album reproduction mode. For example, in response to depression of the switch button, the images are sequentially displayed in the above-described order. Preferably, when a captured file is not stored, a reproduced image is not displayed. When an album file is not registered, an album image is not displayed.

17 Claims, 27 Drawing Sheets

CONTENTS OF Album.inf FILE

| ALBUM FILE NAME | ATTRIBUTE OF ALBUM FILE | FILE NAME OF CAPTURED DATA OF REGISTRATION SOURCE | SERIAL NUMBER OF DIGITAL CAMERA USED FOR CAPTURING | DATE AND TIME OF CAPTURING |
|---|---|---|---|---|
| ...... | ...... | ...... | ...... | ...... |
| Albm0003.jpg | ReadOnly | Pict0006.jpg | 01234567 | 2002/12/01/12:34:56 |
| Albm0004.jpg | ReadOnly | Pict0022.jpg | 01234567 | 2002/12/01/14:42:31 |
| ...... | ...... | ...... | ...... | ...... |
| Albm0094.jpg | ReadOnly | Pict0234.jpg | 01234567 | 2002/12/10 08:40:22 |

FIG. 21

CONTENTS OF Album.inf FILE

| ALBUM FILE NAME | ATTRIBUTE OF ALBUM FILE | FILE NAME OF CAPTURED DATA OF REGISTRATION SOURCE | SERIAL NUMBER OF DIGITAL CAMERA USED FOR CAPTURING | DATE AND TIME OF CAPTURING |
|---|---|---|---|---|
| ......... | ......... | ......... | ......... | ......... |
| Albm0101.jpg | ReadOnly | Pict0021.jpg | 01234567 | 2002/12/04 12:34:56 |
| Albm0101.wav | ReadOnly | Pict0032.wav | 01234567 | 2002/12/11/ 10:21:03 |

FIG. 22

CONTENTS OF Album.inf FILE

| ALBUM FILE NAME | ATTRIBUTE OF ALBUM FILE | FILE NAME OF CAPTURED DATA OF REGISTRATION SOURCE | SERIAL NUMBER OF DIGITAL CAMERA USED FOR CAPTURING | DATE AND TIME OF CAPTURING |
|---|---|---|---|---|
| ⋮ | ⋮ | ⋮ | ⋮ | ⋮ |
| Albm0101.wav | ReadOnly | Pict0012.wav | 01234567 | 2002/12/02 12:34:56 |

FIG. 23

```
SETUP OF CAMERA
- - - - - - - - - - - - - - - - - -
ALBUM REGISTRATION OF MOVING IMAGE FILE
- - - - - - - - - - - - - - - - - -
◇ONLY HEAD FRAME
◆ALL OF FRAMES
```

FIG. 24

CONTENTS OF Album.inf FILE

| ALBUM FILE NAME | ATTRIBUTE OF ALBUM FILE | FILE NAME OF CAPTURED DATA OF REGISTRATION SOURCE | SERIAL NUMBER OF DIGITAL CAMERA USED FOR CAPTURING | DATE AND TIME OF CAPTURING |
|---|---|---|---|---|
| ... | ... | ... | ... | ... |
| Albm0101.jpg | ReadOnly | Pict0013.avi | 01234567 | 2002/12/03 12:34:56 |

FIG. 25

CONTENTS OF Album.inf FILE

| ALBUM FILE NAME | ATTRIBUTE OF ALBUM FILE | FILE NAME OF CAPTURED DATA OF REGISTRATION SOURCE | SERIAL NUMBER OF DIGITAL CAMERA USED FOR CAPTURING | DATE AND TIME OF CAPTURING |
|---|---|---|---|---|
| ...... | ...... | ...... | ...... | ...... |
| Albm0101.avi | ReadOnly | Pict0013.avi | 01234567 | 2002/12/03 12:34:56 |

F I G . 2 6
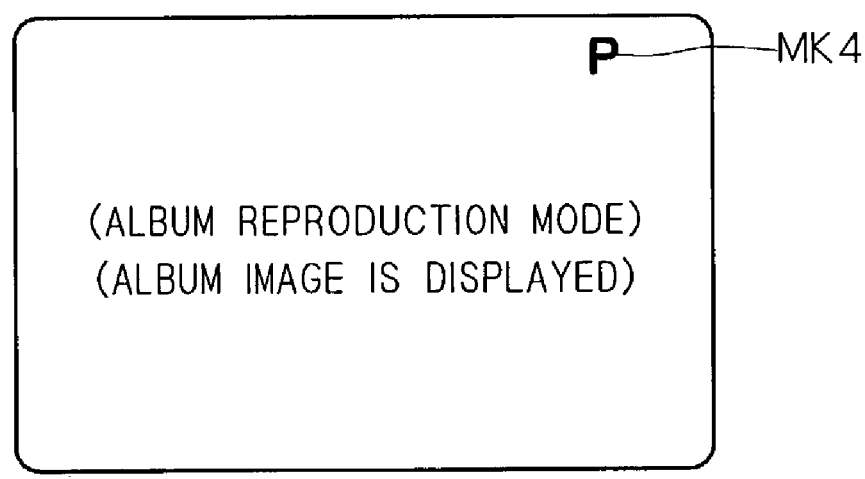

FIG. 29

CONTENTS OF Album.inf FILE

| ALBUM FILE NAME | ATTRIBUTE OF ALBUM FILE | FILE NAME OF CAPTURED DATA OF REGISTRATION SOURCE | SERIAL NUMBER OF DIGITAL CAMERA USED FOR CAPTURING | DATE AND TIME OF CAPTURING |
|---|---|---|---|---|
| ...... | | ...... | ...... | ...... |
| Albm0003.jpg | ReadOnly | Pict0006.jpg | 01234567 | 2002/12/01 12:34:56 |

CANCEL OF PROTECTION

CONTENTS OF Album.inf FILE

| ALBUM FILE NAME | ATTRIBUTE OF ALBUM FILE | FILE NAME OF CAPTURED DATA OF REGISTRATION SOURCE | SERIAL NUMBER OF DIGITAL CAMERA USED FOR CAPTURING | DATE AND TIME OF CAPTURING |
|---|---|---|---|---|
| ...... | | ...... | ...... | ...... |
| Albm0003.jpg | Archive | Pict0006.jpg | 01234567 | 2002/12/01 12:34:56 |

DIGITAL CAMERA HAVING AN IMPROVED USER INTERFACE

This application is based on application No. 2003-063957 filed in Japan, the contents of which are hereby incorporated by reference.

BACKGROUND OF THE INVENTION

1. Field of the Invention

The present invention relates to a digital camera.

2. Description of the Background Art

In a digital camera, a captured image is recorded on a recording medium such as a memory card. Since the number of captured images which can be stored in a recording medium is limited, after a proper number of captured images are stored into the recording medium, data of the captured images is moved from the memory card to a hard disk of a personal computer or the like to assure a free space of the recording medium.

However, since image data moved to a personal computer or the like does not remain the digital camera, even if the moved image is a favorite one, it cannot be viewed on the digital camera.

As a technique for solving such a problem, a favorite image is stored in a memory provided in a digital camera (concretely, the digital cameras EX-S2/EX-M2 of Casio Computer Co., Ltd.). In the digital camera, the user copies a favorite image in captured images to generate an image for registration (also referred to as a favorite image or album image) and stores the image separately from the captured images (see "Digital Camera EX-S2/EX-M2 Instruction Manual", Casio Computer Co., Ltd., September, 2002).

According to the technique, even after a captured image is moved to a personal computer or the like, the favorite image remains in the memory in the digital camera, so that the user can view the favorite image by using the digital camera.

In the digital camera according to the conventional technique, however, in order to view the registered favorite image file, in other words, a file registered as an album (hereinafter, also referred to as an album file), a complicated operation of repeating depression of a cursor button in a plurality of hierarchical menu screens is necessary. That is, the conventional digital camera has a problem such that it is difficult for the user to easily view the registered favorite image.

SUMMARY OF THE INVENTION

An object of the present invention is to provide an image capturing apparatus allowing the user to view an album file or the like more easily.

In order to achieve the object, according to a first aspect of the present invention, an image capturing apparatus comprises: an image generator for generating image data; a first data file generator for generating a first data file including image data generated by the image generator; a second data file generator for generating a second data file different from the first data file on the basis of the first data file; a display for displaying various images; and a selector for giving an instruction for switching a display image on the display, wherein the display changes the display image among an image based on image data generated by the image generator, an image based on image data included in the first data file, and an image based on image data included in the second data file, in response to the instruction from the selector.

In the image capturing apparatus, the user can easily view a second data file.

These and other objects, features, aspects and advantages of the present invention will become more apparent from the following detailed description of the present invention when taken in conjunction with the accompanying drawings.

DESCRIPTION OF THE DRAWINGS

FIG. 3 is a diagram showing an internal configuration of the digital camera;

FIG. 6 is a diagram showing the contents of an album information file;

FIG. 21 is a diagram showing the contents of an album information file after an after-recording file is registered into an album;

FIG. 22 is a diagram showing the contents of an album information file after a voice recording file is registered into an album;

FIG. 23 is a diagram showing a menu screen for making a setting regarding album-registration of a moving image file;

FIG. 24 is a diagram showing the contents of the album information file after the head frame of a moving image file is registered in an album;

FIG. 25 is a diagram showing the contents of the album information file after the whole moving image file is registered in an album;

FIG. 26 is a diagram showing a display screen in a state where an album image to be reproduced in an album reproduction mode is protected;

FIG. 29 is a diagram showing an example of rewriting of an album information file at the time of canceling protection;

DESCRIPTION OF THE PREFERRED EMBODIMENTS

Hereinafter, embodiments of the present invention will be described with reference to the drawings.

Outline of Configuration

Figure 1:
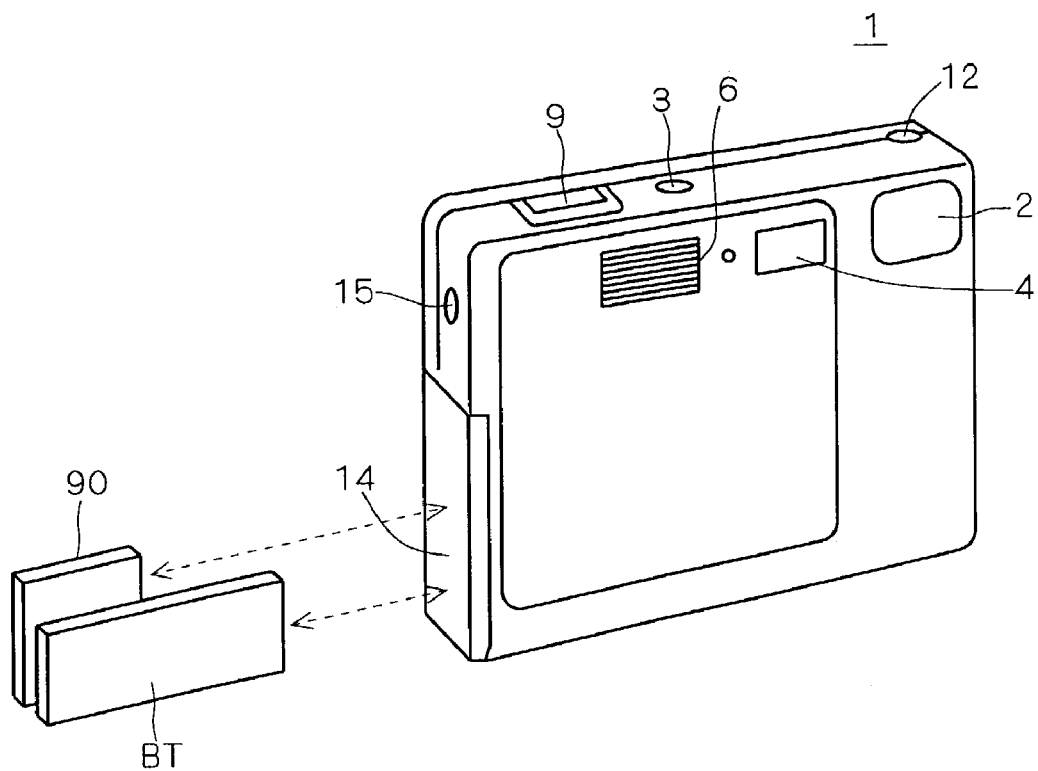
FIG. 1 is a schematic perspective view showing a front face side of a digital camera 1.
Figure 2:
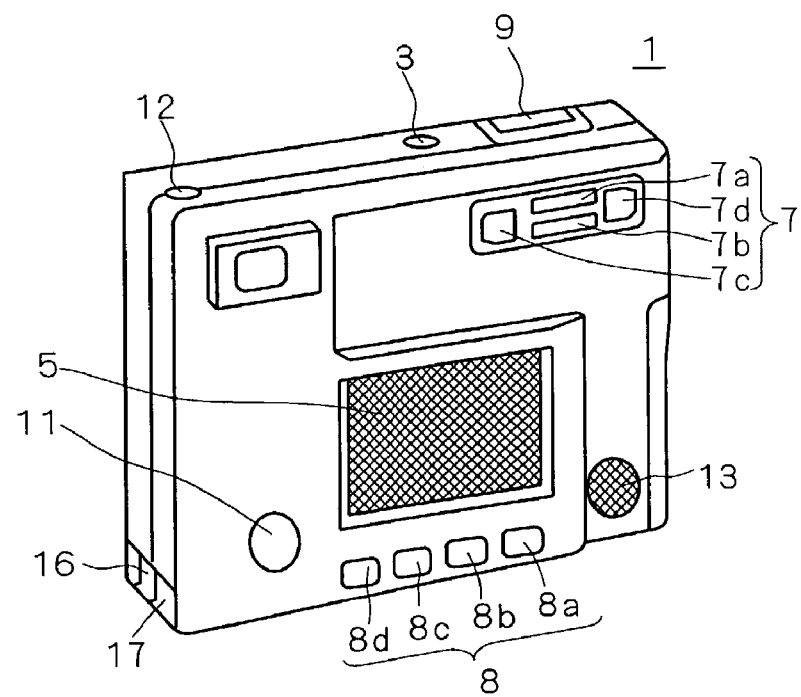
FIG. 2 is a schematic perspective view showing a rear face side of the digital camera 1.

FIGS. 1 and 2 are diagrams each showing an appearance configuration of a digital camera 1 according to an embodiment of the present invention. FIG. 1 is a schematic perspective view showing a front face side. FIG. 2 is a schematic perspective view showing a rear face side.

As shown in FIGS. 1 and 2, the digital camera 1 has an almost rectangular parallelepiped shape of a thin type.

As shown in FIG. 1, the digital camera 1 has a taking lens 2, an optical finder 4 and a flash 6 on its front face side, and has a power source button 3, a shutter button (release button) 9 and a microphone 12 on its top face side. As shown in FIG. 2, the digital camera 1 has a liquid crystal display (hereinafter, abbreviated as LCD) 5, button groups 7 and 8, a quick review button (hereinafter, also referred to as a QV button) 11 and a speaker 13 on its back face side. The button group 7 has cross cursor buttons (or cursor keys) 7a to 7d, and the button group 8 has an execution button 8a, a menu button 8b, a flash mode button 8c and a liquid crystal monitor button 8d. Further, as shown in FIGS. 1 and 2, the digital camera 1 has, a cover 14, a DC input terminal 15, a USB terminal 16 and an AV output terminal 17 in its side faces.

Figure 3:
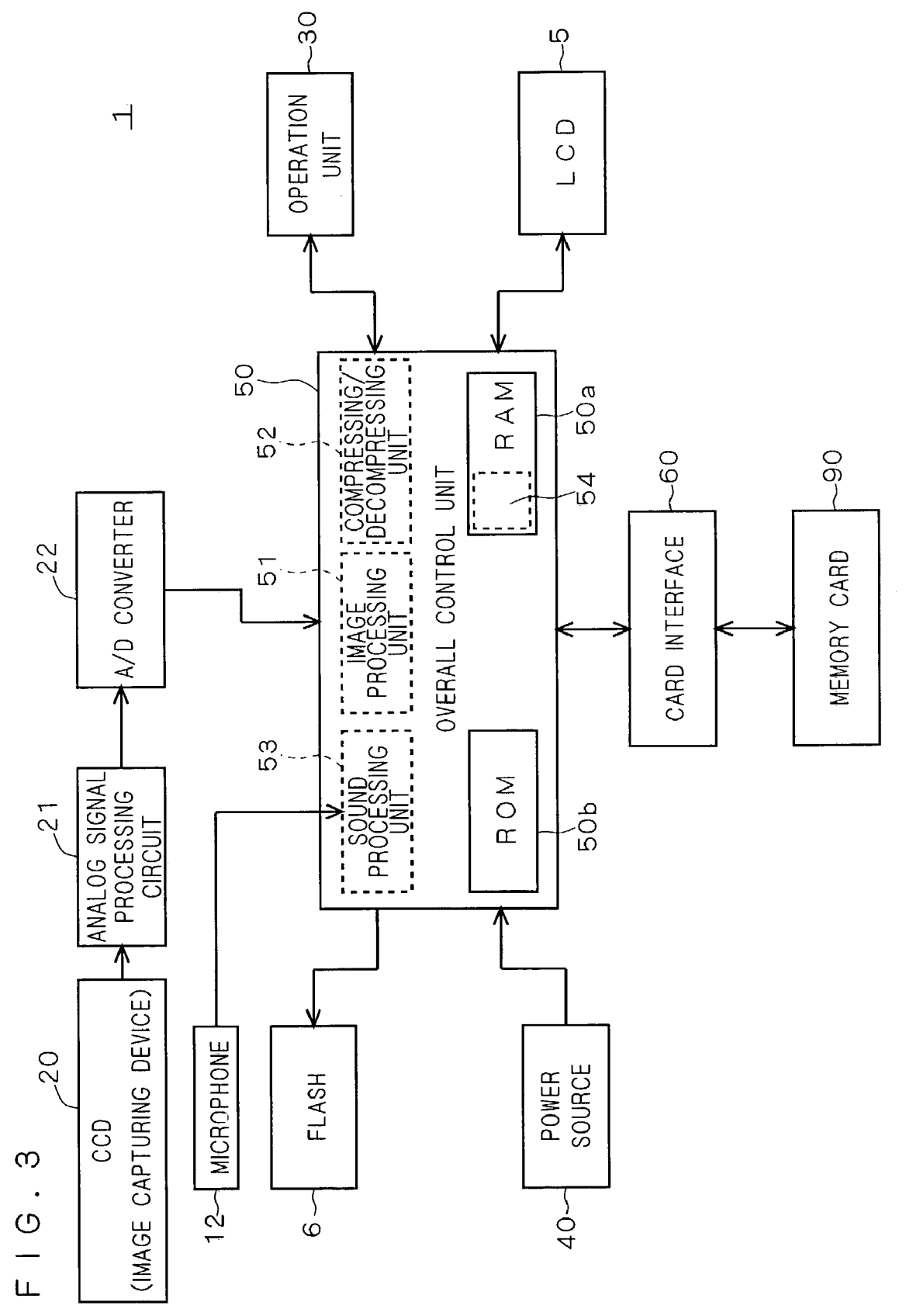

As will be described later, the digital camera 1 obtains image data of a subject by photoelectrically converting a subject image from the taking lens 2 by a CCD (image capturing device) 20 (FIG. 3).

The power source button 3 is used to accept an operation of turning on/off the power source. Concretely, each time the power source button 3 is depressed, the power source is turned on and off alternately.

The shutter release button 9 is a two-stage press switch capable of detecting a lightly pressed (half-pressed) state (hereinafter, also referred to as a state S1) and a pressed (full-pressed) state (hereinafter, also referred to as a state S2) by the user (operator) so as to be discriminated from each other. In the lightly pressed state S1, an automatic focus control is started. In the pressed state S2, an image capturing operation for capturing an image to be recorded is started.

The LCD 5 displays a preview (or live view) before the image capturing operation and reproduces and displays a recorded image. The LCD 5 has a predetermined number (320×240 herein) of display pixels and can display a color image.

The operator perceives the position, size and the like of a subject in a captured image by the live view display on the LCD 5 and can perform a framing operation. The framing operation can be also performed by using only the optical finder 4 without using the LCD 5.

The QV button 11 has the function of switching among a plurality of operation modes in the digital camera 1, concretely, a capturing mode, a reproduction mode and an album reproduction mode (which will be described later). As will be described later, as a rule, each time the QV button 11 is depressed, the three modes are sequentially and cyclically selected. Since an image displayed on the LCD 5 is also switched in association with a change in the operation mode, the QV button 11 can be also expressed as a switch button for switching an image displayed on the LCD 5.

The menu button 8b has the function of switching between display and non-display of a menu on the LCD 5. For example, each time the menu button 8b is depressed in an initial screen of each operation mode, a menu screen and a non-menu screen (display screen such as a live view, a reproduced image or the like) are alternately displayed on the LCD 5. The display cursor in the menu screen displayed on the LCD 5 can be moved in four ways by using the cross cursor buttons 7a to 7d. Further, by depressing the execution button 8a in a state where a desired option is selected, a setting operation corresponding to the option is executed. By such an operation, setting of various image capturing parameters, album registration (which will be describe later) and the like can be performed.

The flash mode button 8c is a button for determining the mode of the flash 6. Each time the flash mode button 8c is depressed, the flash mode is switched in order of automatic flash, forced flash and flash inhibition.

The liquid crystal monitor button 8d is a button for switching between display and non-display of the liquid crystal monitor. Each time the liquid crystal monitor button 8d is depressed, a state where an image or the like is displayed on the liquid crystal monitor (display state) and a state where no image is displayed (non-display state) are alternately switched. In the non-display state, power consumption can be reduced.

The microphone 12 is used to obtain (record) sound data at the time of moving image capturing, making of a voice memo, voice recording, and after recording.

The speaker 13 has the function of outputting sound and is used at the time of reproducing sound data or image data (still image or moving image) with sound.

Further, the cover 14 is provided in a portion for covering a battery space and a memory card insertion port. In other words, on the inside of the cover 14, a battery space in which a power source battery BT is housed and a memory card insertion port in which a memory card 90 as a removable recording medium (portable recording medium) is inserted are provided. The power source battery BT and the memory card 90 are detachably inserted into the battery space and the memory card insertion port, respectively. Image data obtained by the image capturing operation, album image data which will be described later, and the like is recorded on the memory card 90 to be set in the insertion port. The digital camera 1 can receive power supply from the power source battery BT and power supply from an AC adapter (not shown) by using the DC input terminal 15.

The USB terminal 16 is a terminal for performing data communication with a personal computer or the like. By connecting a USB standard cable or the like to the USB terminal 16, data communication with an external device (such as a personal computer) can be performed.

The AV output terminal 17 is a terminal for connection to an external video sound device (Audio-Visual device: AV device) such as a television. By connecting a predetermined AV code between the AV output terminal 17 and the input terminal of the external video sound device, an image and/or sound can be outputted to the external video sound device.

Referring to FIG. 3, the internal configuration of the digital camera 1 will now be described. FIG. 3 is a block diagram showing the internal functions of the digital camera 1.

The CCD (image capturing device) 20 functions as image capturing means for capturing a subject image and generating an electronic image signal and has, for example, 1600×1200 pixels. The CCD 20 photoelectrically converts a light image of the subject formed by the taking lens 2 into image signals (signal made of a signal sequence of pixel signals received by the pixels) of R (red), G (green) and B (blue) pixel by pixel and outputs the image signal.

The image signal obtained from the CCD 20 is supplied to an analog signal processing circuit 21. In the analog signal processing circuit 21, the image signal (analog signal) is subjected to a predetermined analog signal process. The analog signal processing circuit 21 has a correlated double sampling circuit (CDS) and an automatic gain control circuit (AGC) and adjusts the level of the image signal by performing a process of reducing noise in the image signal by the correlated double sampling circuit and adjusting the gain by the automatic gain control circuit.

An A/D converter 22 converts each of pixel signals of the image signal into a digital signal of 12 bits. The digital signal obtained by the conversion is temporarily stored as image data in a buffer memory 54 in a RAM 50a. The image data stored in the buffer memory 54 is subjected to WB (white balance) process, γ correction process, color correction process and the like by an image processing unit 51 and, after that, the processed signal is subjected to a compressing process or the like by a compressing/decompressing unit 52.

A sound signal obtained from the microphone 12 is inputted to a sound processing unit 53. The sound signal inputted to the sound processing unit 53 is converted into a digital signal by an A/D converter (not shown) provided in the sound processing unit 53 and the digital signal is temporarily stored in the buffer memory 54.

An operation unit 30 is an operation unit including the power source button 3, button groups 7 and 8, shutter release button 9, and QV button 11 and is used when the user performs an operation of changing a setting state of the digital camera 1 and an image capturing operation.

A power source 40 is a power supply source of the digital camera 1. The digital camera 1 is driven by using a secondary battery such as a lithium ion battery as the power source battery BT.

An overall control unit 50 is constructed by a microcomputer having therein the RAM 50a and a ROM 50b. When the microcomputer executes a predetermined program, the overall control unit 50 functions as a controller for controlling the above-described components in a centralized manner. The overall control unit 50 also controls, for example, a live view display process and a process of recording data to a memory card. The RAM 50a is a semiconductor memory (such as DRAM) which can be accessed at high speed and the ROM 50b takes the form of, for example, an electrically-rewritable nonvolatile semiconductor memory (such as flash ROM). An area as a part of the RAM 50a functions as a buffer area for temporary storing data. This buffer area is referred to as the buffer memory 54. The buffer memory 54 temporarily stores image data and sound data.

The overall control unit 50 has the image processing unit 51, compressing/decompressing unit 52 and sound processing unit 53. The processing units 51, 52 and 53 are function parts realized when the microcomputer executes a predetermined program.

The image processing unit 51 is a processing unit for performing various digital imaging processes such as WB process and γ correcting process. The WB process is a process of shifting the level of each of the color components of R, G and B and adjusting color balance. The γ correcting process is a process of correcting the tone of pixel data. The compressing/decompressing unit 52 is a processing unit for performing an image data compressing process and an image data decompressing process. As the compressing method, for example, the JPEG method is employed. The sound processing unit 53 is a processing unit for performing various digital processes on sound data.

A card interface (I/F) 60 is an interface for writing/reading image data to/from the memory card 90 inserted into the insertion port in the side face of the digital camera 1.

At the time of reading/writing image data from/to the memory card 90, the process of compressing or decompressing image data is performed according to, for example, the JPEG method in the compressing/decompressing unit 52, and image data is transmitted/received between the buffer memory 54 and the memory card 90 via the card interface 60. Also at the time of reading/writing sound data, sound data is transmitted/received between the buffer memory 54 and the memory card 90 via the card interface 60.

Further, by using the card interface 60, the digital camera 1 transmits/receives data such as an image and sound and, in addition, can load a program which operates on the digital camera 1. For example, a control program recorded on the memory card 90 can be loaded into the RAM 50a or ROM 50b of the overall control unit 50. In such a manner, the control program can be updated.

Also by communication with an external device (such as an external computer) via the USB terminal 16, various data such as an image and sound and a control program can be transmitted/received. For example, various data, a program, and the like recorded on a recording medium (CD-R/RW or CD-ROM) which is set into a reader (optical drive device or the like) of the external computer can be obtained via the USB terminal 16.

Captured Image and Album Image

A captured image and an album image will now be described.

Figure 4:
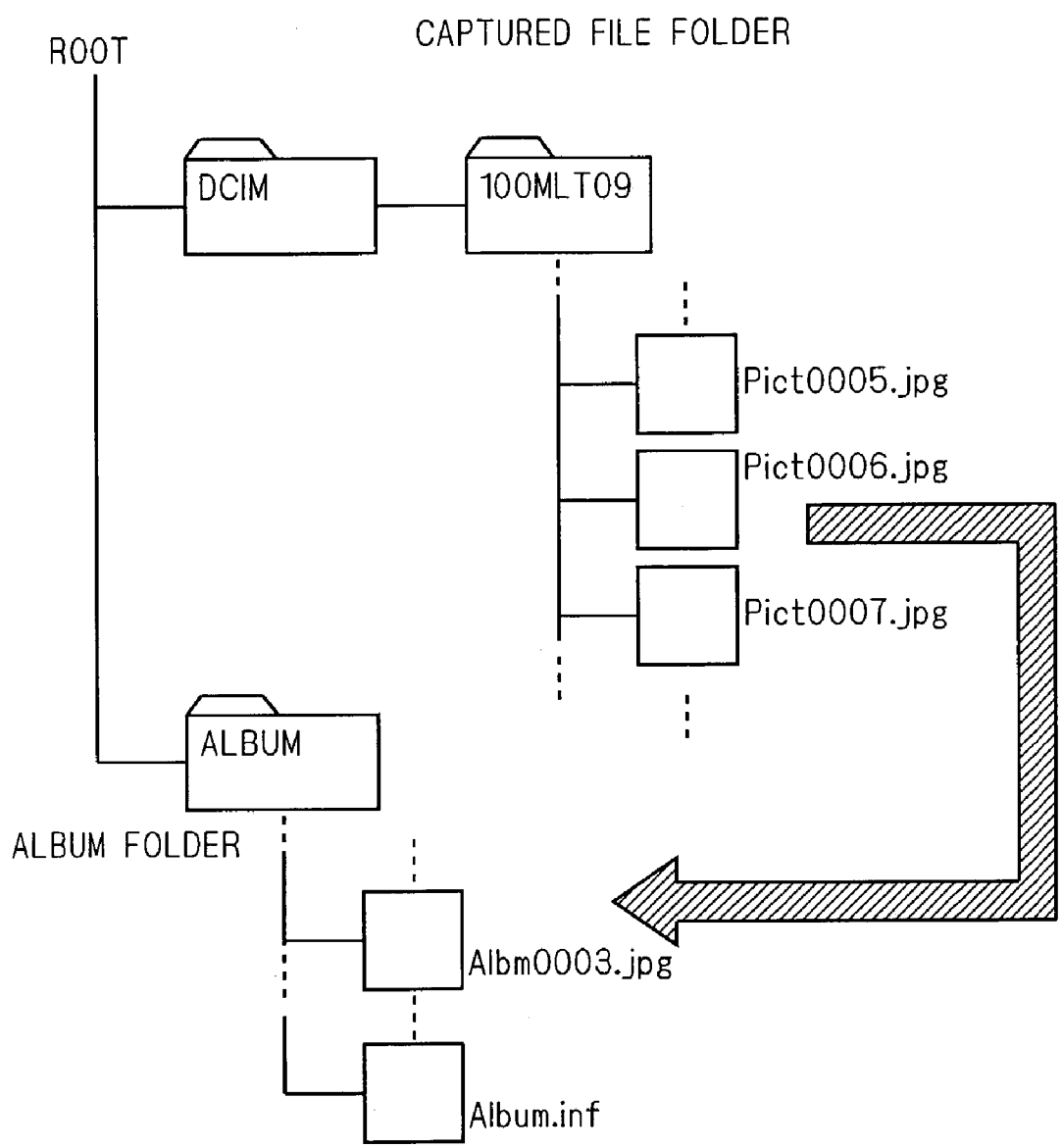
FIG. 4 is a diagram showing a folder structure in a memory card.

FIG. 4 is a diagram conceptually showing the folder structure in the memory card 90. As shown in FIG. 4, a file of captured images is generated in accordance with the format of DCF (Design rule for Camera File system) and recorded. Captured image files are stored in a folder "100MLT09". The folder "100MLT09" is a folder generated under a folder "DCIM". The folder "DCIM" is a folder generated under a root folder. The folder "100MLT09" will be also referred to as a "captured file folder" (or "recording folder").

The name of each captured image file is constructed by eight characters (Pict0005) in the head, a period (.) and an extension of three characters (jpg) like "Pict0005.jpg". In the eight characters in the head, the four alphabets in the first half indicate the kind (such as a captured file (which will be described later) of a captured image or the like), and the four numerals in the latter half denote a serial number serially designated in accordance with order of generation of captured images (captured file).

Therefore, by repeating the image capturing operation by the digital camera 1, files of names "Pict0001.jpg", "Pict0002.jpg", "Pict0003.jpg", "Pict0004.jpg", "Pict0005.jpg", "Pict0006.jpg", . . . are generated in this order and stored in the memory card 90.

In the digital camera 1, a favorite image of the operator in captured images can be registered so as to be discriminated from the other captured images. In the specification, such a function will be referred to as an "album registration" function and an image newly generated in correspondence with an original file such as a captured image file by the album registration will be referred to as an "album image". Each of album images is stored as an image separate from the captured image into a folder (concretely, a folder "ALBUM") different from the folder of the captured image. The folder "ALBUM" for storing album images (hereinafter, also referred to as an "album folder") is a folder generated under the root folder.

The name of a file of album images is given on the basis of a rule similar to that of a captured image. The four alphabets (Albm) in the first half in the eight characters in the head of the file name indicate the kind (indicating that the image is registered as an album), and the four numerals in the latter half indicate a serial number which is serially given in order of generation of album images.

As shown in FIG. 4, for example, when the operator registers a file of the name "Pict0006.jpg" as a favorite image, a file of an album image (album image file) having the name of "Albm0003.jpg" is generated. Since it is assumed here that the third album image is generated, the serial number of the album image file generated is "0003".

The album folder has not only the album image files but also a file in which basic information regarding a plurality of files registered as an album is recorded (hereinafter, also referred to as "album information file"). The album information file is shown as a file having the name of "Album.inf" in FIG. 4 and has a configuration as shown FIG. 6. The contents of the album information file will be described later.

By such an album registering function, the operator can register a favorite image out of captured images as an album image.

The album image is handled so as to be discriminated from the captured images. Consequently, after the captured images are moved to an external device such as a personal computer and erased from the memory card 90, the image registered in an album remains in the memory card 90. Therefore, even after the captured images are erased from the memory card 90, the operator can read the favorite image registered in the album from the memory card 90 and display it on the LCD 5. That is, the operator can easily view it. Particularly, since the memory card 90 of a larger capacity than that of a built-in memory can be used, as compared with the case of storing an album image in the built-in memory, a larger number of images can be stored.

Printing can be also performed by using an album image remaining in the memory card 90. The user can therefore easily print a favorite image. Particularly, when the memory card 90 is directly inserted into a printer adapted to direct printing and direct printing is performed, a favorite image can be printed very easily.

Figure 5:
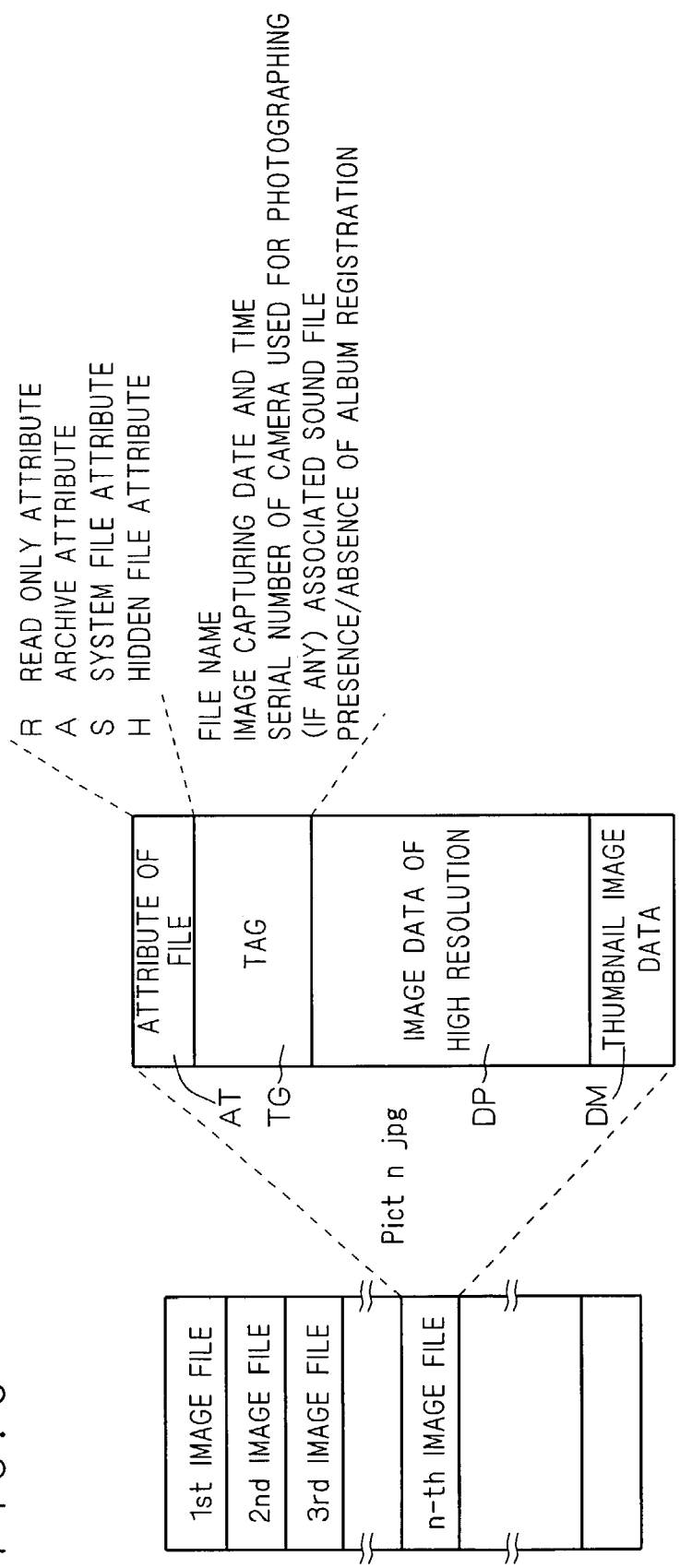
FIG. 5 is a diagram schematically showing the configuration of each image file.

FIG. 5 is a diagram conceptually showing the structure of each file. Although FIG. 5 shows the structure of a captured image file, the album image file also has a similar structure.

As shown in FIG. 5, each captured image file is generated as a file of a predetermined format (the Exif format here). Concretely, a file of each captured image has tag information TG, image data DP of high resolution compressed in the JPEG format (image signal of 1600×1200 pixels), and image data DM for displaying a thumbnail image (image signal of 80×60 pixels). The tag information TG includes information such as "file name", "date and time of photographing", "serial number of camera used for photographing", "related sound file" and "presence/absence of album registration".

Each of the album image files is generated as a file of a similar format (Exif format here). Each album image file has, similarly, the tag information TG, image data DP of high resolution compressed in the JPEG format, and image data DM for displaying thumbnail image. However, to reduce the data amount, as the image data DP of high resolution, data converted to an image signal of lower resolution than resolution of a captured image is stored. Concretely, the image data DP of the album image is generated by once decompressing the image data DP of a captured image of the size of 1600×1200 pixels stored in the memory card 90 in a compressed state by the compressing/decompressing unit 52, converting the resultant image to an image of a size of 640×480 pixels by a resolution converting process by the image processing unit 51 or the like and, further, re-compressing the image into an image in the JPEG format by the compressing/decompressing unit 52. In the tag information TG of the captured image file, although "presence/absence of album registration" is unnecessary, the information such as "date and time of photographing", "serial number of camera used for photographing" and "related sound file" is stored as it is as the tag information TG of the album image file.

An attribute AT is determined for each file. Concretely, one of four attributes of "read-only attribute (R)", "archive attribute (A)", "system file attribute (S)" and "hidden file attribute (H)" is determined for each file. For a captured image, usually, either "archive attribute (A)" or "read-only attribute (R)" is given. For a file to which "archive attribute" is given, both reading and writing operations are permitted. For a file to which "read-only attribute" is given, only the reading operation is permitted and the writing operation is prohibited.

To the captured image file, "archive attribute (A)" is given at the time of photographing. On the other hand, to the album image file, "read-only attribute (R)" is given at the time of registration. Since "read-only attribute (R)" is initially given to an album image file, an important album image registered as a favorite image can be prevented from being erased by erroneous operation.

The digital camera 1 can perform not only capturing of a still image but also capturing of a moving image and capturing (recording) of sound. In the specification, a data file obtained by such an image capturing (recording) and/or sound capturing (recording) operation is generically referred to as a "captured file (or recording file)". The captured file is also expressed as a file containing image data and/or sound data.

The object of album registration is not limited to a still image but may be an image file of a moving image, sound and the like. In the specification, a file newly generated in correspondence with a captured file and registered in an album will be referred to as an "album registration file (or album registration object)" or simply "album file". The album file is generated on the basis of an original captured file (data file) under control of the overall control unit 50 and stored in a folder different from a folder of the original captured file.

The album registration operation and the like mainly on an image (particularly, still image) will be described later.

Outline of State Transition in Digital Camera

Figure 7:
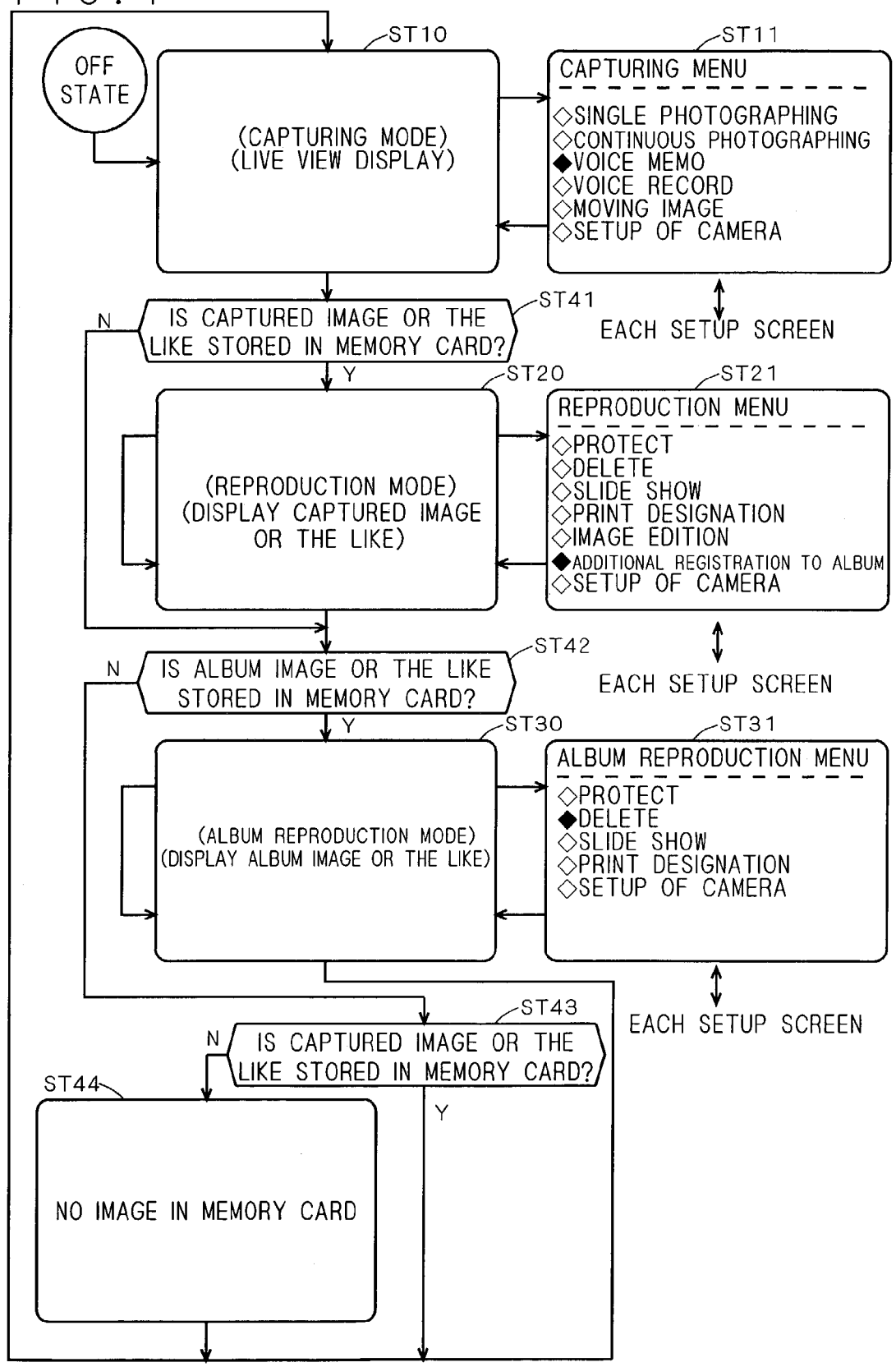
FIG. 7 is a diagram showing a state transition in the digital camera.

FIG. 7 is a diagram showing a state transition in the digital camera 1 and mainly shows a display state in the LCD 5. In each of round-cornered rectangles in FIG. 7, a display screen on the LCD 5 is displayed. Prior to description of the details of the album registration operation, outline of the state transition in the digital camera 1 will be described with reference to FIG. 7.

First, when the power source is turned on in response to depression of the power source button 3, the digital camera 1 shifts to a state ST10. In the state ST10, the digital camera 1 is set in the "capturing mode" and a live view image as a preview image for image capturing is displayed on the LCD 5. "Capturing mode" is a mode of capturing or recording an image (moving image or still image) or sound.

As described above, the digital camera 1 has not only the "capturing mode" but also "reproduction mode" and "album reproduction mode". "Reproduction mode" is a mode of reproducing a file of a captured image (and recorded sound and the like), and "album reproduction mode" is a mode of reproducing an album file.

For switching the modes, the QV button 11 is used. As a rule, each time the QV button 11 is depressed, the digital camera 1 sequentially and cyclically shifts to the three modes. Exceptionally, when a captured file does not exist in the memory card 90, the digital camera 1 does not shift to the "reproduction mode". When the album file does not exist in the memory card 90, the digital camera 1 does not shift to the "album reproduction mode".

The mode switching will be described in more detail later.

When the QV button 11 is depressed once in the state ST10, whether a captured file is stored in the memory card 90 or not is determined (state ST41).

If even one captured file is recorded in the memory card 90, the digital camera 1 shifts to a state ST20. The state ST20 is a state where the digital camera 1 is set in the "reproduction mode" and a reproduction image of a captured image or the like is displayed on the LCD 5. In the state ST20, a reproduced image of an image captured most recently is displayed first on the LCD 5. Each time the left key 7c or right key 7d is depressed, a file to be displayed on the LCD 5 is sequentially changed in forward or reverse order of capturing.

On the other hand, when even one captured file is not recorded in the memory card 90, the digital camera 1 shifts to a state ST42.

Also in the case where the QV button 11 is depressed again in the state ST20, the digital camera 1 shifts to state ST42.

In the step ST42, whether an album file is stored in the memory card 90 or not is determined.

If even one album file is recorded in the memory card 90, the digital camera 1 shifts to state ST30. The state ST30 is a state where the digital camera 1 is set in the "album reproduction mode" and an album image is displayed on the LCD 5. In the state ST30, first, an album image in the album file registered most recently is displayed on the LCD 5. Each time the left or right key 7c or 7d is depressed, the file to be displayed on the LCD 5 is changed sequentially in forward or reverse order of registration.

On the other hand, in the case where even one album file is not recorded in the memory card 90, the digital camera 1 shifts to a state ST43 and whether even one captured file is not recorded in the memory card 90 or not is determined. If it is determined that no captured file nor album file is recorded in the memory card 90, the digital camera 1 shifts to a state ST44, displays characters indicating "no image in memory card", and returns to the state ST10. When it is determined that a captured file is recorded in the memory card 90, the digital camera 1 returns to the state ST10 without shifting to the state ST44.

Also in the case where the QV button 11 is depressed again in the state ST30, the digital camera 1 shifts again to the state ST10.

By the operations, when both a captured file and an album file are recorded in the memory card 90, each time the QV button 11 is depressed, the three modes ("capturing mode", "reproduction mode", and "album reproduction mode") are sequentially and cyclically selected. In response to depression of the QV button 11, a displayed image is changed among a live view image in the capturing mode, a reproduction image related to a data file in the reproduction mode, and an album image related to an album file in the album reproduction mode. Therefore, an album image or the like can be displayed only by depression of the button, so that the user can easily view an album image.

When the captured file is recorded in the memory card 90 but the album file is not recorded, in response to depression of the QV button 11, "captured image mode" and "reproduction mode" are sequentially and cyclically selected. In other words, only when the memory card 90 has an album file, the state is changed to the state where an album image is displayed in response to depression of the QV button 11. As described above, when no album file exists in the memory card 90, the screen is not switched to the screen displaying an album file. Therefore, useless switching can be eliminated.

Further, when the album file is recorded in the memory card 90 but a captured file is not recorded, in response to depression of the QV button 11, "capturing mode" and "album reproduction mode" are sequentially and cyclically selected. In other words, when the memory card 90 does not have a captured file, in response to depression of the QV button 11, a display image is changed only between the live view image and the album image. That is, when the captured file does not exist in the memory card 90, the screen is not switched to the screen for displaying a captured file. Therefore, useless switching can be eliminated.

When both the album file and the captured file are not recorded in the memory card 90, only "capturing mode" can be selected. At this time, characters indicating "no image in memory card" are displayed on the LCD 5 in response to depression of the QV button 11, so that the operator can recognize that the mode cannot be changed.

A state transition from each of the states ST10, ST20 and ST30 will now be described.

When the menu button 8b is depressed in the state ST10, the digital camera 1 shifts to a state ST11. When the menu button 8b is depressed again, the digital camera 1 returns to the state ST10. A state ST11 is a state where the mode can be changed to a sub mode in the capturing mode and "capturing menu" for setting a kind of capturing is displayed on the LCD 5. In the state ST11, while the live view image is continuously displayed as a background image, items of the capturing menu screen are overlaid.

When the menu button 8b is depressed in the state ST20, the digital camera 1 shifts to the state ST21. When the menu button 8b is depressed again, the digital camera 1 returns to the state ST20. The state ST21 is a state where various settings in the reproduction mode can be made, and "reproduction menu" as a menu screen for performing various setting operations is displayed on the LCD 5. In the state ST21, while the captured image (reproduced image) is displayed as a background image, items of the reproduction menu screen are overlaid.

Further, when the menu button 8b is depressed in the state ST30, the digital camera 1 shifts to the state ST31. When the menu button 8b is depressed again, the digital camera 1 returns to the state ST30. The state ST31 is a state where various settings can be made in the album reproduction mode and "album reproduction menu" as a menu screen for performing various setting operations is displayed on the LCD 5. In the state ST31, while the album image is continuously displayed as a background image, items of the album reproduction menu are overlaid.

Figure 8:
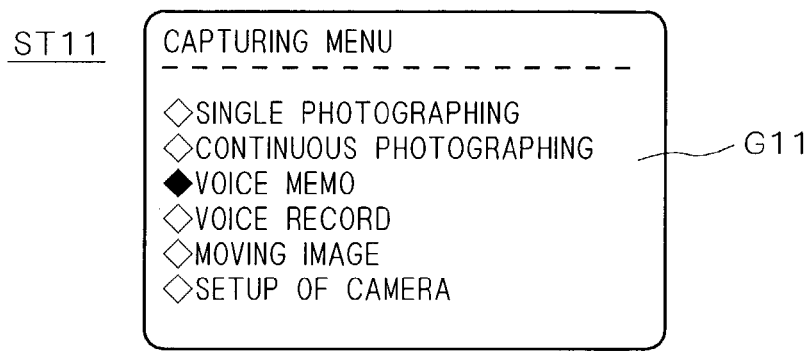
FIG. 8 is a diagram showing a photographing menu screen.
Figure 9:
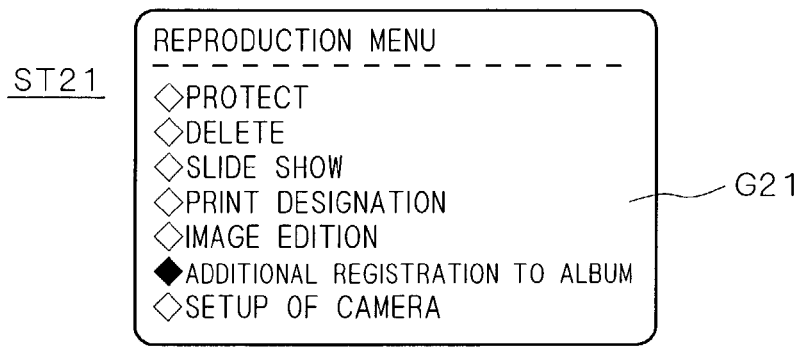
FIG. 9 is a diagram showing a reproduction menu screen.
Figure 10:
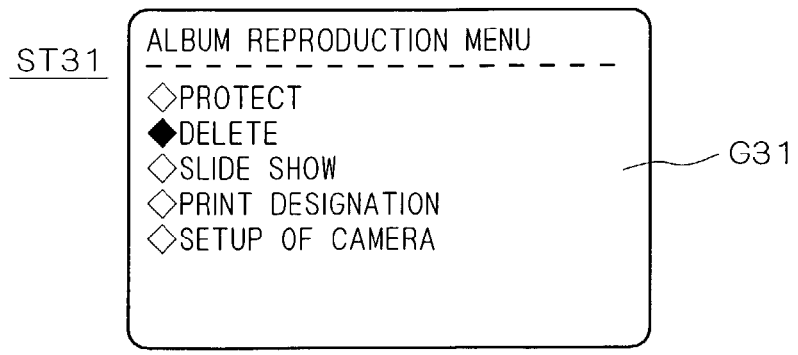
FIG. 10 is a diagram showing an album reproduction menu screen.

FIGS. 8, 9 and 10 are diagram showing menu screens G11, G21 and G31 displayed on the LCD 5 in the states ST11, ST21 and ST22, respectively.

FIG. 8 is a diagram showing an example of the photographing menu screen G11 in the state ST11. By performing various setting operations using the capturing menu screen G11 and the like, the kind of capturing and the like can be changed. Concretely, when "single photographing" or "continuous photographing" is selected, a still image can be captured. When "moving image" is selected, a moving image can be captured. Sound recording operation can be also performed. For example, by selecting "voice memo", sound can be recorded for predetermined period after capturing one still image. By selecting "voice record", only sound can be recorded without accompanying recording of a still image.

FIG. 9 is a diagram showing an example of the reproduction menu screen G21 in the state S21. FIG. 10 is a diagram showing an example of the album reproduction menu screen G31 in the state S31. By performing various operations using the menu screens G21, G31 and the like, various setting operations regarding captured images and the like can be performed.

As understood from comparison between FIGS. 9 and 10, the reproduction menu screen G21 and the album reproduction menu screen G31 have similar configurations. Specifically, items of "protect", "delete", "slide show", "print designation" and "setup of camera" exist in each of the menus. That is, the items of the menu screens G21 and G22 match each other partially.

In other words, each of the menu screens in the reproduction mode and the album reproduction mode has a hierarchical structure. The menu screens in the same hierarchy in the two modes (for example, the menu screens G21 and G31 in the first hierarchy displayed first after the initial screens G20 and G30 of the two modes) have the same items ("protect", "delete", "slide show", "print designation" and "setup of camera").

Therefore, in any of the reproduction mode and the album reproduction mode, a setting operation regarding each of the items "protect", "delete", "slide show", "print designation" and "setup of camera" can be realized by a similar operation using similar menu screens G21, G31 and the like. Thus, uniformity in the operations increases. In other words, the user can perform similar setting operations by common operation, so that operability is high.

On the other hand, "reproduction menu" is clearly shown by using characters on the menu screen G21 in the reproduction mode. "Album reproduction menu" is clearly shown by using characters on the menu screen G31 in the album reproduction mode. Specifically, each of the menu screens G21 and G31 in the reproduction mode and the album reproduction mode has an "identification part" indicative of the menu screen of the reproduction mode or album reproduction mode. Therefore, the operator can certainly recognize that the menu screen displayed on the LCD 5 is the menu screen G21 in the reproduction mode or the menu screen G31 in the album reproduction mode.

Particularly, in the embodiment, the reproduction mode (state ST20) and album reproduction mode (state ST30) can be easily switched in response to depression of the QV button 11. In response to a further operation (concretely, depression of the menu button 8b), the state can be easily shifted from the state ST20 to the state ST21, similarly, from the state ST30 to the state ST31. It is expected that the operator erroneously recognizes that the menu screen in the state ST21 or ST31 is a menu screen in a wrong state (of a wrong mode) due to easy mode shifting operation.

However, even in such a case, by the identification part displayed in each of the menu screens G21 and G31 in the states ST21 and ST31, the operator can easily recognize whether a displayed screen is the menu screen of either the reproduction mode or album reproduction mode. Therefore, erroneous operation caused by erroneous recognition of the mode can be prevented. Although the identification part is constructed by using characters here, the identification part may be constructed by using a predetermined figure or the like.

At the left end of each of the items in the menu screen, one of three signs (concretely, blank rhombus, painted rhombus and x mark) is displayed. The x mark indicates an unselectable item. The sign of the blank rhombus denotes a selectable item. The painted rhombus denotes an item which is being selected at present. When the operator changes the selection item by using the up key 7a or down key 7b and depresses the execution button 8a in a state where the sign of a desired selection item is changed to the painted rhombus, the operation corresponding to the selected item (concretely, display of a sub menu screen) is executed. It is also possible to express an unselectable item by displaying characters of the selection item in light color in place of giving the x mark.

Album Registration

The album registration operation will now be described in detail.

Figure 11:
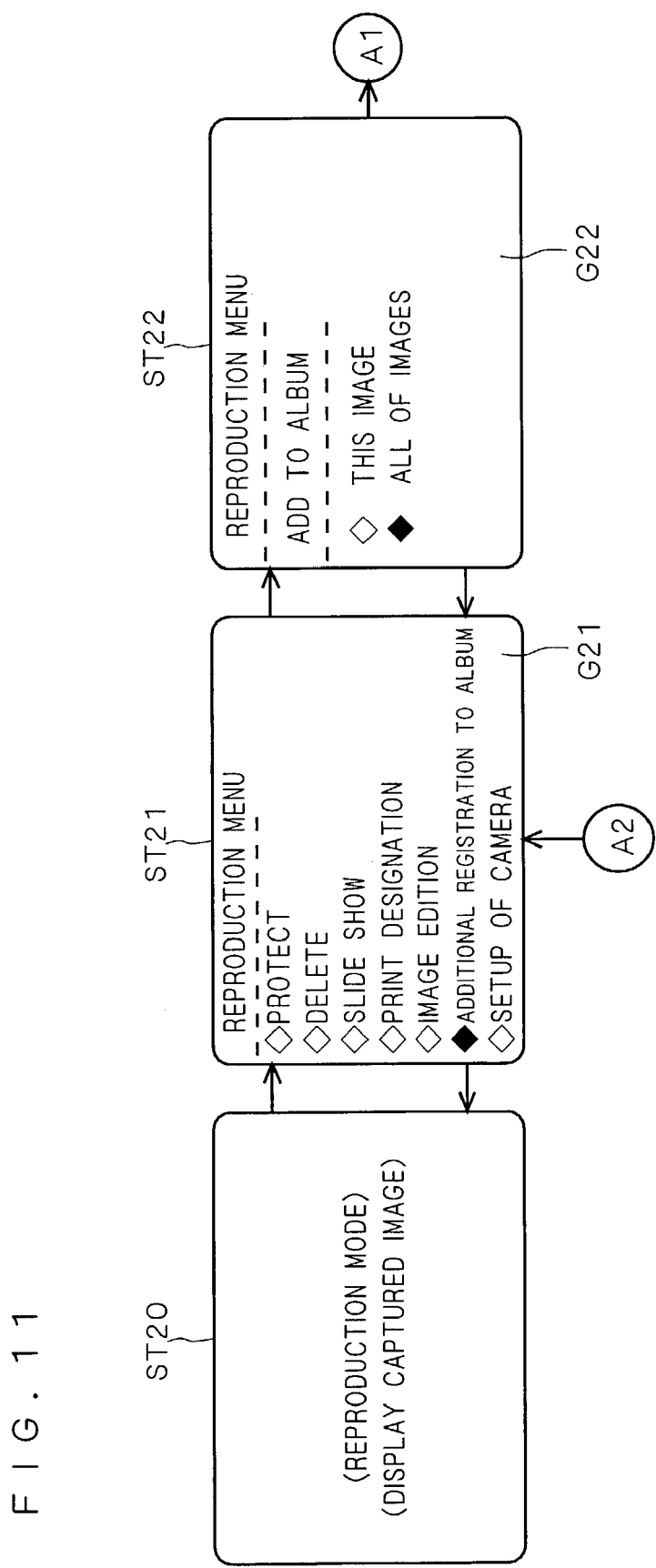
FIG. 11 is a diagram showing a state transition in a reproduction mode.
Figure 12:
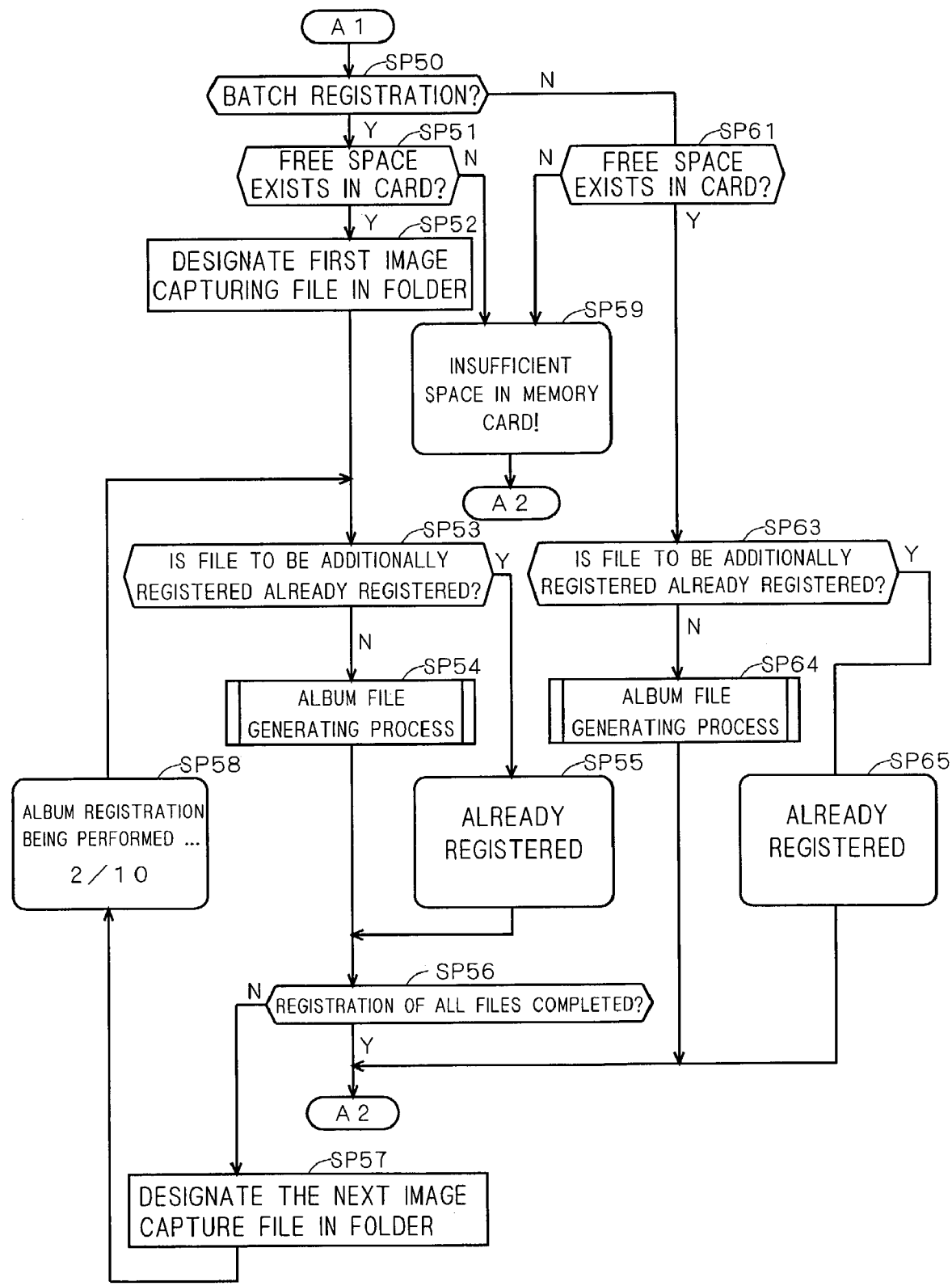
FIG. 12 is a flowchart showing the general flow of an album registration operation.
Figure 13:
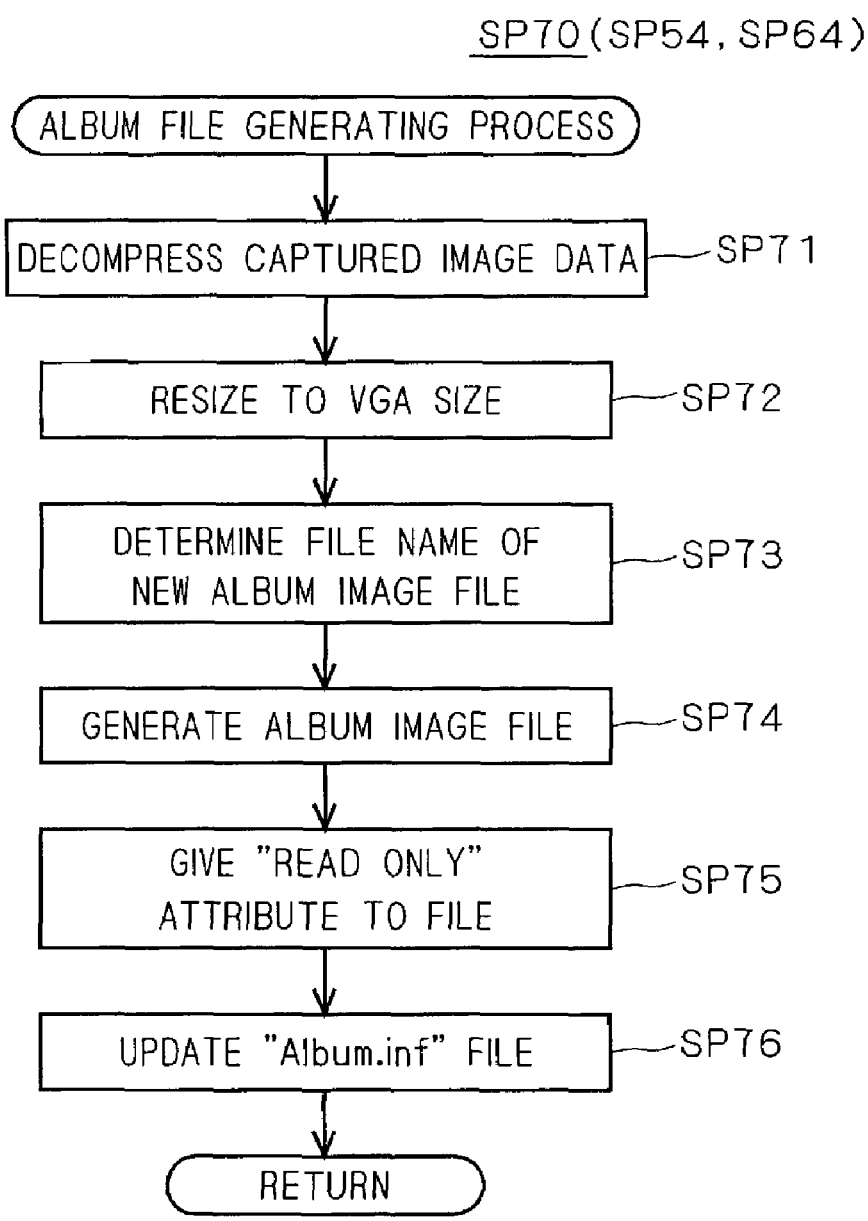
FIG. 13 is a flowchart showing the flow of a part of FIG. 12.

FIGS. 11 to 13 are diagrams for describing a registering procedure. FIG. 11 is a diagram showing a state transition in the reproduction mode. FIG. 12 is a flowchart showing the general flow of the registering operation. FIG. 13 is a flowchart showing the flow of a part of the operation.

First, as shown in FIG. 11, when the menu button 8b is depressed in the state ST20, the digital camera 1 shifts to a state ST21. When an item of "additional registration to album" is selected in the reproduction menu screen G21 displayed on the LCD 5 in the state ST21 with the key 7 and the execution button 8a is depressed, the digital camera 1 shifts to a state ST22. In the state ST22, when the menu button 8b is depressed, the digital camera 1 can return to the state ST21.

In the state ST22, a menu screen G22 for additional registration is displayed. In the menu display G22 in the state ST22, while a captured image being reproduced is displayed as a background image, menu items are overlaid.

In the menu screen G22, two items of "this image" and "all of images" are displayed. The item "this image" in the former item corresponds to a command for instructing registration of the captured image displayed as a background. The item "all of images" in the latter item corresponds to a command for instructing registration of a plurality of (all, in this case) captured images in a captured file folder ("100MLT09" (see FIG. 4)) in a lump.

When any of the items is selected in the menu screen G22 and the execution button 8a is depressed, the overall control unit 50 determines that the instruction input of album registration is accepted and executes the album registration operation.

The album registration operation will be described with reference to FIG. 12.

First, in step SP50, whether the instruction of registering all of images is given or not is determined. In the case where the instruction of batch registration is given, the program advances to step SP51. If not (that is, in the case where the instruction of registering images one by one is given), the program advances to step SP61.

In step SP51, free space in the memory card 90 is checked. A space necessary for the batch registration (in other words, space necessary to register all of files in the captured file folder into an album) and a free space (the capacity of an unused area) in the memory card 90 are compared with each other. When it is determined that the space necessary for the batch registration is not left in the memory card 90, characters or the like indicating that the space in the memory card is insufficient are displayed for a predetermined period (for example, a few seconds) (step SP59) and the digital camera 1 returns to the state ST21 (FIG. 11). On the other hand, when it is determined that the space necessary for the batch registration remains in the memory card 90, the program advances to step SP52.

In step SP52, the first file (the file of the smallest serial number) in the captured file folder is designated as a file on which the registering process is to be performed (file to be registered).

In step SP53, whether an album file corresponding to the data file to be registered has been already generated or not, in other words, whether the file to be registered is a file already registered in an album or not is determined. That is, a check of overlap registration is made.

In the case where it is detected that the file to be registered is already registered in an album, the program advances to step SP55 where a warning of overlap registration is outputted. For example, characters or the like indicating that the same captured file as the file to be registered has already been registered in an album are displayed as a warning on the LCD 5. In order to avoid overlap registration, registration of the file to be registered into an album is inhibited and, without registering the file to be registered into an album, the program advances to step SP56. In such a manner, the same captured file (data file) can be prevented from being overlap-registered into an album.

On the other hand, in the case where the file to be registered has not been registered in an album yet, the program advances to an album file generating process in step SP54.

FIG. 13 is a flowchart showing detailed operation (step SP70) of the album file generating process in steps SP54 and SP64. Description will be given on precondition that the file to be registered is a still image file.

First, in step SP71, image data of high resolution (1600× 1200 pixels) of the captured file as an object is decompressed. The resultant image data is resized to the VGA size (640×480 pixels) in step SP72 and re-compressed.

In step SP73, the file name of a new album image file is determined. In particular, a serial number of a new file name is determined. Concretely, the digital camera 1 refers to the album information file ("Album.inf" (see FIG. 6)) and determines the number obtained by incrementing the largest number of serial numbers of existing registered files (that is, the serial number of the file registered most recently) as the serial number of the new file. For example, as shown in FIG. 6, when the latest registration file is "Albm0094.jpg", the serial number of the new file is "0095". The name of the new album image file is determined as "Albm0095.jpg". The name is generated by combining "Albm" indicative of an album file and an extension "jpg" indicating that the kind of data is a still image.

In step SP74, by using data resized in the VGA size and compressed according to the JPEG method or the like, an album image file having the name "Albm0095.jpg" is generated. In step SP75, the attribute of the new file is set as "read only" attribute. By the operation, the new file is protected.

After that, in step SP76, the information of the file "Albm0095.jpg" is added to the album information file ("Album.inf"), thereby updating the album information file.

FIG. 12 will be referred to again.

In step SP56, whether the album registration has been finished on all of captured images or not is determined.

In the case where an unprocessed captured image exists in the captured file folder, the next file is designated as a file to be registered (step SP57), progress is displayed (step SP58), and the processes in step SP53 and subsequent steps are repeated. In the progress display, a message that the album registration is being done and the file being processed are shown. For example, by displaying a message like "album registration is being performed. . . . 2/10", it can show that the second file out of total ten files is being processed.

On the other hand, when the album registration process on all of captured images in the captured file folder has been completed, the routine is finished and the digital camera 1 returns to the state ST21. In response to selection of "all of images" in the state ST22 (FIG. 11) and one depression of the execution button 8a (that is, input of instruction of batch registration), a plurality of album files are generated. Since it is unnecessary to repeat the series of operations of the button operation for designating an image to be registered and the operation of depressing the execution button 8a for starting registration, the operation at the time of batch registration is easy. Particularly, frequency of the album registration process on "all" of captured images in a captured file folder performed by the operator is high. Such a registration operation can be facilitated.

Also in the case where the program advances from step SP50 to step SP61 (in the case where instruction of individual registration is given), similar operations are performed. Processes in steps SP61, SP63, SP64 and SP65 are similar to processes in steps SP51, SP53, SP54 and SP55, respectively. In step SP61, whether the space necessary for registering one file into an album remains in the memory card 90 or not is determined.

In the overlap registration check in steps SP53 and SP63, information of the album information file "Album.inf" is used.

The album information file includes, as shown in FIG. 6, information regarding each of a plurality of album files registered. Concretely, the album information file includes the file name and file attribute of each of album files included in an album folder and, in addition, information of the file name of the captured file as a registration source of each album file, the serial number of a digital camera used for recording the captured file, and date and time of recording the captured file is described.

For example, with respect to the album file "Albm0003.jpg", it is described that the file attribute is "read only", the original image at the time of corresponding album registration is "Pict0006.jpg", the date and time of capturing the original image is 12:34:56 of Dec. 1, 2002, and the product serial number of a digital camera used for capturing the original image (identification number of the camera) is "01234567". The product serial number is described in the ROM 50b of each digital camera 1. The product serial number which is stored in the ROM 50b or the like in the digital camera 1 is read at the time of photographing and written in the tag information TG of the captured file. The date and time of image capturing is also written in the tag information TG. Consequently, the digital camera 1 can read the tag information TG of the file to be registered and record various information to the album information file.

In the steps SP53 and SP63, depending on whether the three conditions (three pieces of information) of the file name of the original image at the time of album registration, the serial number of the digital camera, and the date and time of image capturing in the captured file to be registered coincide with those of the registered captured file or not, whether the captured file to be registered has been already registered in an album or not is determined. Since it is considered that not only the file name of the original image but also the serial number of the digital camera and the date and time of photographing coincide with those or not, the overlap registration can be determined more accurately.

The present invention is not limited to the above. The overlap registration may be determined depending on whether one or two conditions out of the three conditions coincide or not. For example, depending on whether two conditions of the file of an original image in album registration and the serial number of the digital camera in the captured file to be registered and those of the registered captured file coincide with each other or not, whether the captured file to be registered has been already registered in an album or not can be determined. Since it is considered that not only the file name of the original image but also the serial number of the digital camera coincide with the corresponding conditions or not, overlap registration can be determined more accurately. In such a manner, consequently, for example, it can be accurately determined that captured images of two files photographed by different digital cameras at the same time and on the same date by chance are inherently different from each other.

In the foregoing embodiment, only by selecting "all of images" in the state ST22 and depressing the execution button 8a, all of files in a captured file folder can be registered in a lump into an album, so that the operation is easy.

In the case of batch registration, the serial numbers of album files newly registered are designated in ascending order of the serial numbers of the original captured files. Thus, in the corresponding relation between the serial number of the album file and the serial number of the captured file, the order is not changed. Therefore, the relation between the original captured file and the album file can be easily grasped.

Further, at the time of reproduction of the captured image, whether the captured image has already become an object of album registration or not is determined. If the captured image has already become an object of album registration, a mark indicating that the captured image has been already registered is displayed on the LCD 5 so as to be overlaid on the captured image.

Figure 14:
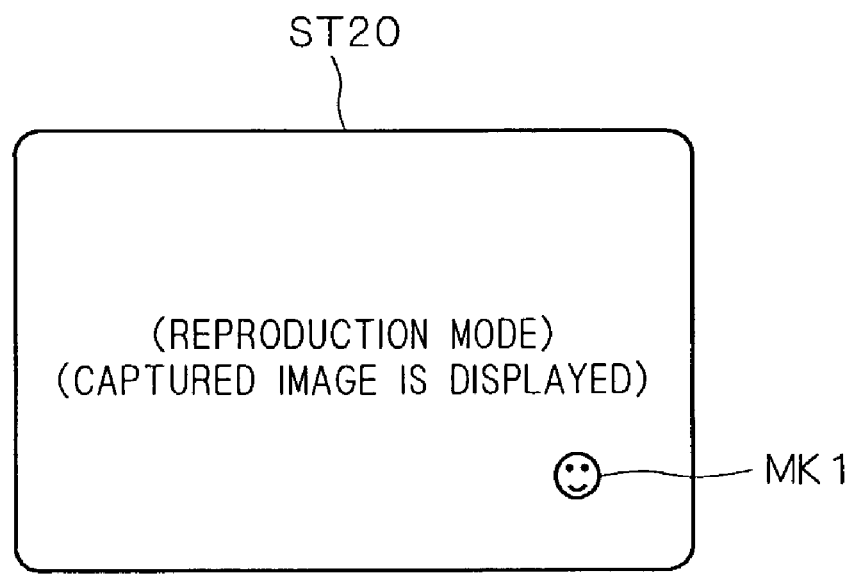
FIG. 14 is a diagram showing a reproduced image to which an album registration mark MK1 is added.

FIG. 14 is a diagram showing a screen displayed on the LCD 5 when the digital camera 1 returns to the state ST20 again after the album registration. As shown in FIG. 14, in the screen, the captured image is displayed and a mark MK1 is displayed in a lower right part in the screen so as to be overlaid on the captured image. The mark MK1 indicates that the captured image is already registered. By the mark MK1, the operator can easily determine that the image has been already registered in an album or not. Not only in the screen of the state ST20 but also screen in the states ST21 and ST22, the mark MK1 is similarly displayed. Consequently, a similar effect can be obtained in any of the states.

Although the case of outputting a warning of overlap registration and inhibiting generation of a plurality of album files (album image files) based on the same data file (captured file) has been described above, the present invention is not limited to the case.

For example, without outputting the warning of overlap registration, generation of a plurality of album files based on the same data file can be inhibited. In other words, with respect to a data file of which corresponding album file has been already generated, re-generation of an album file based on the data file can be inhibited.

More specifically, when overlap registration is detected in step SP53 or SP63 (FIG. 12), without displaying the warning screen of the overlap registration of step SP55 or SP65, the album file generating process in step SP54 or SP64 is not performed.

Figure 15:
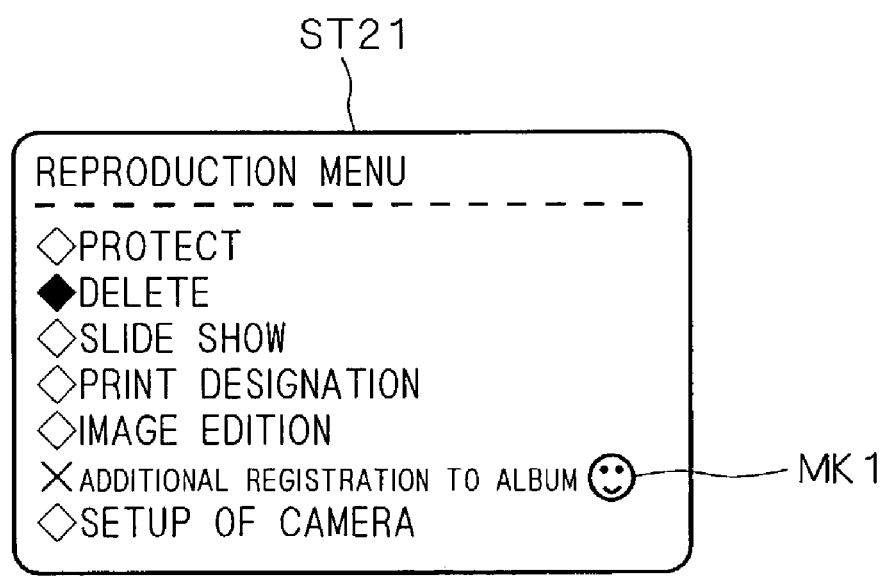
FIG. 15 is a diagram showing a reproduction menu screen according to a modification.

Alternately, the overlap registration may be avoided not by the determining operation in step SP53 or SP63 after the digital camera shifts from the state ST21 (FIG. 11) to the state ST22 but by an operation of displaying a screen as shown in FIG. 15 on the LCD 5 in the state ST21 so as not to shift to the state ST22. In FIG. 15, the sign on the left side of the option of "additional registration to album" is the x mark, so that the option cannot be selected even by key operation of the operator. Therefore, the digital camera 1 cannot move from the state ST21 to the next state ST22 (FIG. 11) in which a registration operation is performed, so that overlap registration can be avoided. As described above, by preventing the option for album registration from being selected on the menu screen of each captured file (data file) in the reproduction mode, the album registration operation may be inhibited on the captured file which has already been registered into an album.

In contrast, even in the case of outputting the warning of overlap registration, re-generation of the album file may be permitted under a predetermined condition. Concretely, a warning of overlap registration is outputted on a warning display screen in step SP55 and an inquiry of whether the album registration is forcedly performed or not is made. Only when an instruction of forcedly performing the album registration is received, the album registration process may be performed. In this case, a chance of determination by the user can be obtained, so that overlap registration can be avoided.

Album Registration of File other than Still Image File

Figure 16:
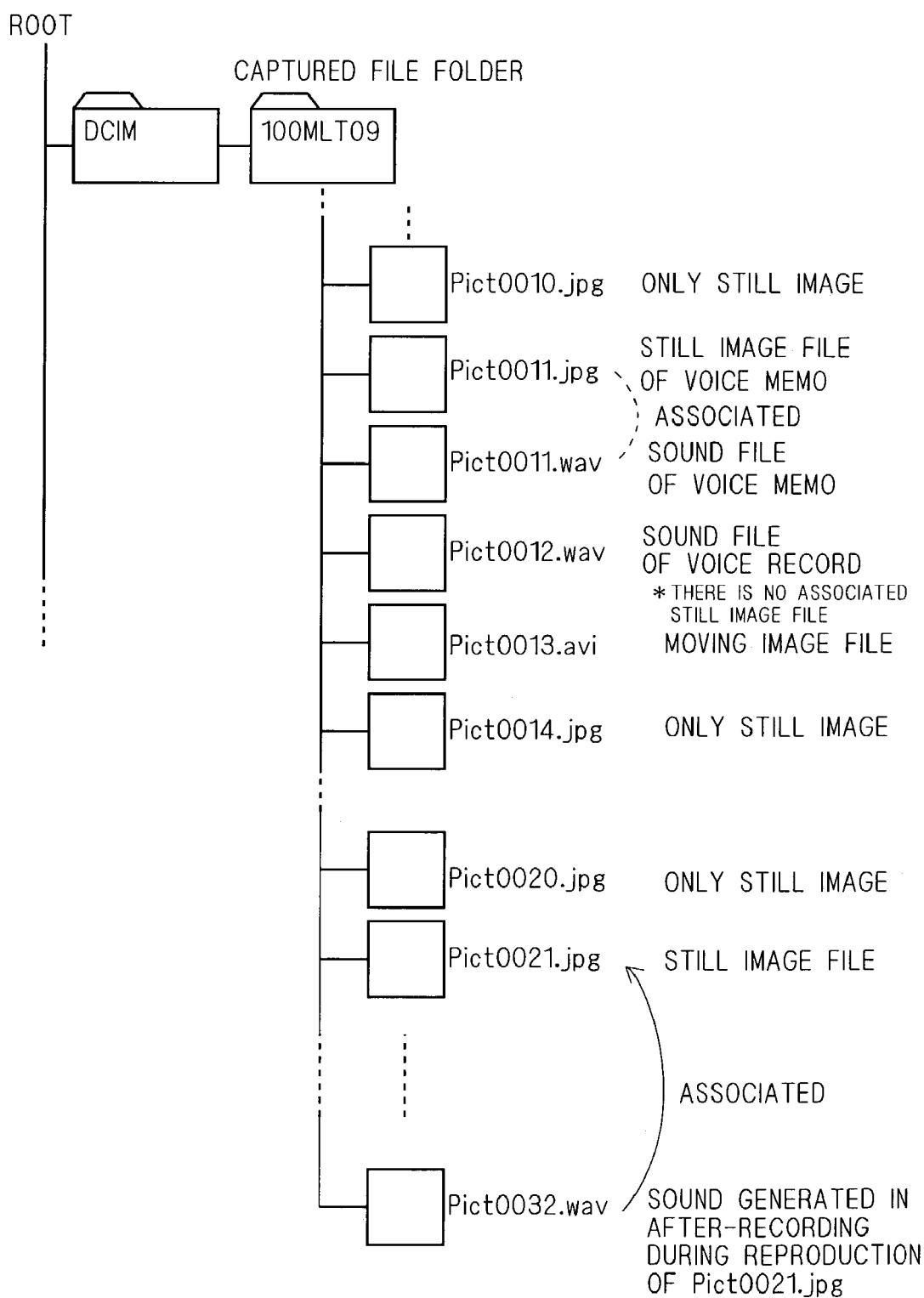
FIG. 16 is a diagram showing an example of a file group stored in a captured file folder in the memory card.

FIG. 16 is a diagram showing an example of a file group stored in the captured file folder in the memory card 90 by the image capturing operation or the like of the digital camera 1.

In the digital camera 1, as shown in FIG. 16, files other than a still image file (for example, "Pict0010.jpg"), concretely, data files regarding a moving image and sound can be set as objects of album registration. More specifically, each of a sound file of "voice memo" (for example, "Pict0011.wav"), a sound file obtained by "voice record" (for example, "Pict0012.wav"), a sound file obtained by "after recording" (for example, "Pict0032.wav"), and a moving image file regarding "moving image" (for example, "Pict0013.avi") can be set as an object of album registration.

Prior to description of the album registering work on various data files, outline of each of the data files will be described.

Each of the files obtained by "voice memo", "voice record" and "moving image" is obtained by a predetermined operation using the capturing menu screen G11 or the like.

For example, when the capturing mode is set to "voice memo" and the shutter release button 9 is depressed, a still image is captured and sound is recorded for predetermined time. FIG. 16 shows the case where the still image file "Pict0011.jpg" is obtained by the image capturing operation together with the sound file "Pict0011.wav" recorded as a voice memo. Although the files have different extensions, their file number is the same. By setting the same file number, it can be easily determined that the files are related to each other.

When the capturing mode is set to "voice record" and, after that, the shutter release button 9 is depressed, recording of sound is started. When the shutter release button 9 is depressed again, the recording of sound is finished. By the recording operation, only a sound file (for example, "Pict0012.wav") obtained by "voice record" is generated. Since a file of the same number does not exist in the captured file folder, it can be determined that no captured image is related to the sound data.

Further, when the capturing mode is set to "moving image file" and the shutter release button 9 is depressed, a moving image recording operation is started. When the shutter release button 9 is depressed again, the moving image recording operation is finished. By the recording operation (image capturing operation), only a moving image file (for example, "Pict0013.avi") is generated.

Figure 17:
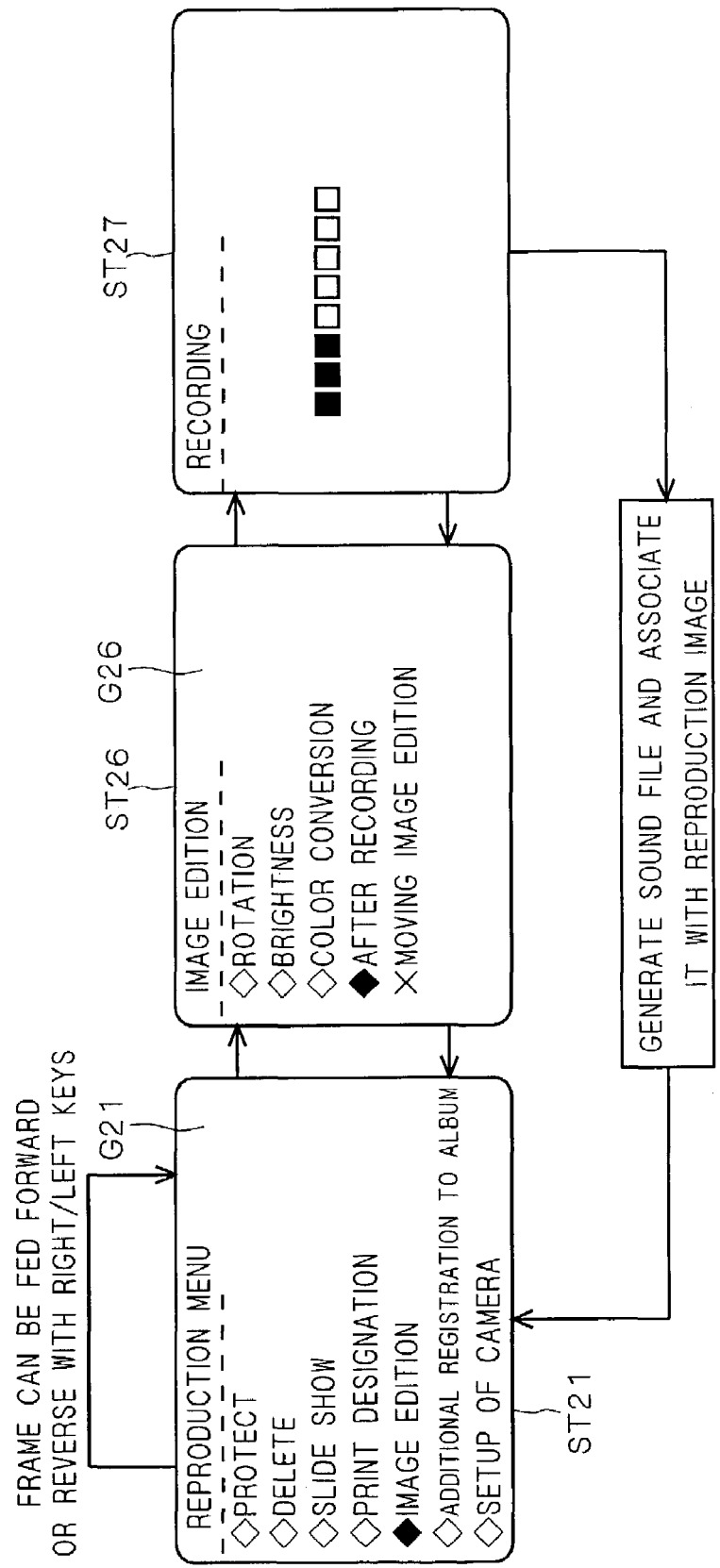
FIG. 17 is a diagram showing a state transition in an "after recording" operation.

The sound data obtained by "after recording" is acquired through a state transition as shown in FIG. 17. Concretely, first, by selecting the item of "image edition" from options in the reproduction menu displayed on the LCD 5 in the state ST21 (see also FIG. 7) and depressing the execution button 8a, the digital camera 1 shifts to the state ST26. When the item of "after recording" is selected from a menu screen (sub menu of "image edition") G26 displayed on the LCD 5 in the state ST26 and the execution button 8a is depressed, the digital camera 1 shifts to the state ST27. In the state 27, recording with the microphone 12 is executed, and the ratio of recording time to the maximum recordable time is displayed by a progress bar. After lapse of the maximum recordable time or when the execution button 8a is depressed again, the after recording is finished. A sound file is generated and associated with a still image file.

For example, when the after-recording operation is performed on the still image file "Pict0021.jpg" after capturing the still image file "Pict0031.jpg", a sound file "Pict0032.wav" is generated in a state where it is associated with the still image file "Pict0021.jpg". The information of association is recorded into the tag information TG of the still image file "Pict0021.jpg" by the digital camera 1. Concretely, "Pict0032.wav" is written as the name of a related file, thereby associating the two files.

The sound file obtained by after-recording and the sound file obtained by voice memo are different from each other with respect to the following point. The former file is generated at the time point of reproduction of a captured image whereas the latter file is generated at the time point of capturing of an image.

Figure 18:
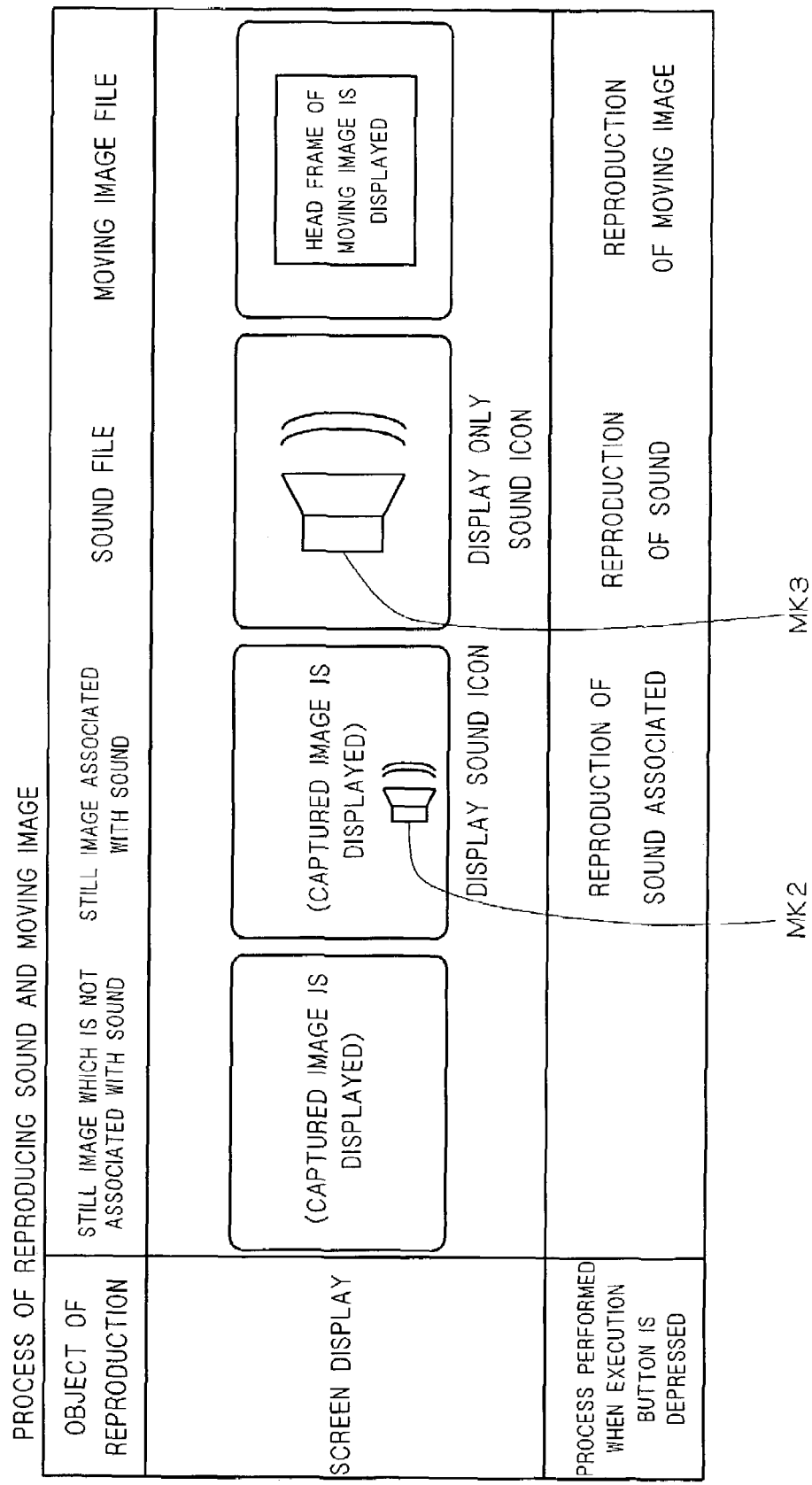
FIG. 18 is a diagram showing screens at the time of reproducing various files.

In the reproduction mode display screen (more specifically, a display screen in states ST21, ST22 and the like (see FIG. 11)), various files are displayed as reproduction images in a state as shown in FIG. 18. FIG. 18 is a diagram showing the screens at the time of reproducing various files. Also in the album reproduction mode, according to the kind of each file, display screens similar to those of FIG. 18 are displayed as album images.

Concretely, a still image file which is not associated with a sound file is displayed as it is on the LCD 5 without being designated with the mark indicative of relation to sound.

A still image file which is associated with a sound file (for example, a still image file subjected to "after recording" or a still image file captured in the "voice memo" mode) is displayed on the LCD 5 in a state where the mark MK2 indicative of sound data is attached to the still image. It clearly shows that the image is associated with sound. In response to depression of execution button 8a after that, an operation of reproducing sound data is started.

Further, with respect to a sound file which is not associated with another image file (for example, a sound file recorded in the "voice recording" mode), a mark MK3 indicative of sound data which is not associated with a captured image is displayed on the LCD 5 without an image. In response to depression of the execution button 8a, an operation of reproducing sound data is started.

With respect to a moving image file, first, the head frame is displayed. In response to depression of the execution button 8a, an operation of reproducing a moving image is started.

The outline of the data file has been described above.

An album registration work of various data files will now be described. The general flow is as described above with reference to FIG. 12. When at least one file of a kind in a captured file folder is designated as a file to be subjected to album registration in state ST22 in the reproduction mode, the album registration operation is executed in the flow as described above.

Figure 19:
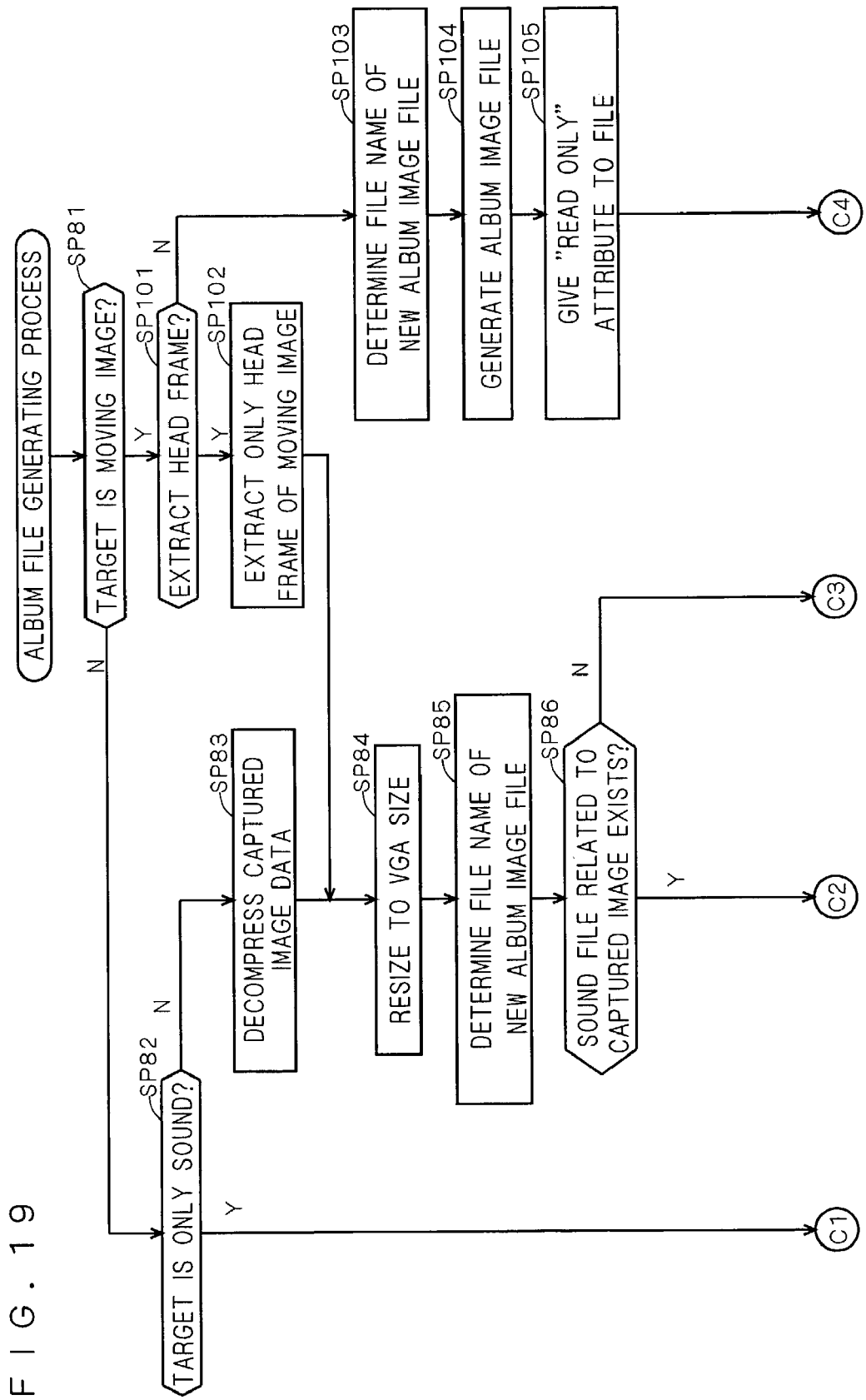
FIG. 19 is a flowchart showing an album generating process.
Figure 20:
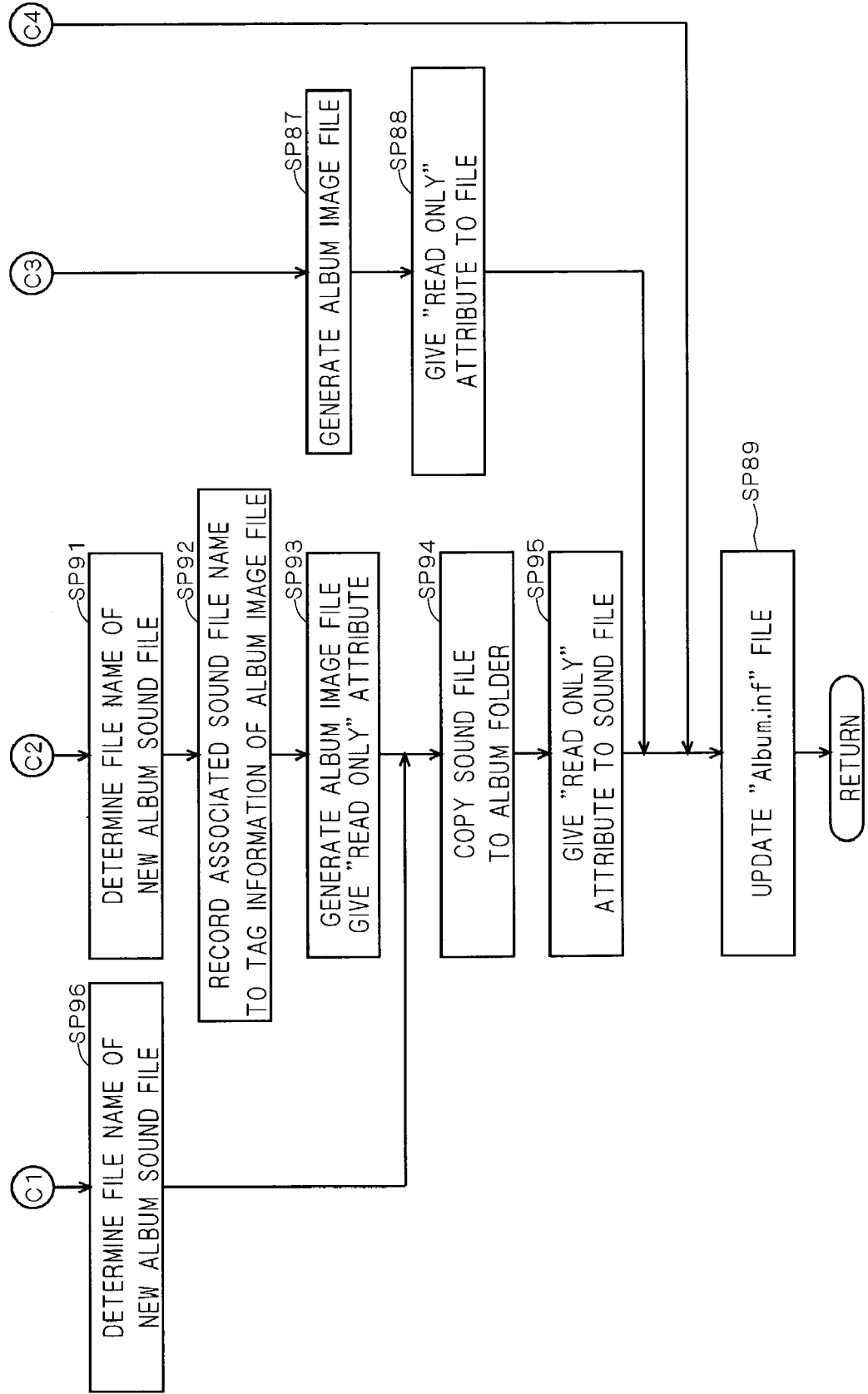
FIG. 20 is a flowchart showing an album generating process.

Although the description has been given with reference to FIG. 13 on precondition that the file to be registered is a still image file, a general album file generating process (steps SP54 and SP64) will now be described with reference to FIGS. 19 and 20. The album file generating process of FIGS. 19 and 20 can be also applied to files other than a still image, concretely, each of the plurality of kinds of files as shown in FIG. 18.

First, in step SP81, whether a file to be registered in an album is a moving image file or not is determined. If "Yes", the program advances to step SP101. If "No" (to be specific, when the file to be registered is a still image file or a sound file), the program advances to step SP82.

In step SP82, whether the object to be registered is a file of only sound or not is determined. If "Yes" (that is, in the case of a sound file obtained by "voice recording"), the program advances to step SP96. If "No" (that is, in the case of still image data associated with sound data), the program advances to step SP83.

In the case where the captured file to be registered is a simple still image file, the processes in steps SP83, SP84 and SP85 are performed and, after that, it is determined in step SP86 that no sound is associated with the captured image. Further, the processes in steps SP87 and SP88 are performed and the program advances to step SP89.

The processes in steps SP83, SP84, SP85, SP87 and SP88 are similar to those in steps SP71, SP72, SP73, SP74 and SP75, respectively. In step SP89, the album information file ("Album.inf") is updated.

On the other hand, when the captured file to be registered has a related sound file, the processes in steps SP83, SP84 and SP85 are performed. After that, it is determined in step SP86 that sound is associated with the captured image. Further, the processes in steps SP91, SP92, SP93, SP94 and SP95 are performed, both the captured image file and the sound file are registered in an album and, after that, the program advances to step SP89. In step SP89, the album information file ("Album.inf") is updated.

For example, the case of registering the still image file "Pict0021.jpg" subjected to the "after recording" work into an album will now be described. With the still image file "Pict0021.jpg", the sound file "Pict0032.wav" is associated by the "after recording" work (see FIG. 16). FIG. 21 is a diagram showing the contents of the album information file which has been updated in step SP89.

In this case, first, in step SP91, the file name of a new album sound file is determined. More specifically, it is determined that the same name (except for the extension part) as that of the new album image file determined in step SP85 is designated to the new album sound file. For example, in the case where the name "Albm0101.jpg" to the album registration file of the still image file "Pict0021.jpg", the name "Album0101.wav" is given to the album registration file of the sound file "Pict0032.wav". As described above, the new album image file and the new album sound file have the same first eight characters (the first four characters of "Albm" and the following four characters indicative of the serial number). Therefore, the relationship can be easily recognized.

In the following step SP92, as tag information of the new album image file, the new album sound file name related to the new album image file is recorded. For example, as the tag information of the new album image file "Albm0101.jpg", information associated with the new album sound file "Albm0101.wav" is written. Also by the association information, the relationship between the files can be recognized.

In step SP93, an album image file is newly actually generated in an album folder and an attribute of "read only" is given to the new album image file. In step SP94, a new album sound file is actually generated in an album folder. The new album sound file is generated by copying the file "Pict0032.wav" and the name determined in step SP91 given as the file name. In step SP95, "read only" attribute is given also to the album sound file.

In the case where the file to be registered is sound data obtained by "voice recording", the program advances from step SP82 to step SP96 and, through steps SP94 and SP95, the sound file obtained by "voice recording" is singly registered in an album. The data in the album registration is written in the album information file ("Album.inf") (step SP89).

Concretely, in step SP96, the name of a new album sound file is determined by adding a serial number of four characters to the four characters "Albm" indicative of an album file. The serial number is determined as a value obtained by incrementing the last serial number of album files written in an album information file by one. As the extension of the file, "wav" indicative of a sound file is added. After that, the new album sound file of the name determined in step SP96 is actually generated in the album folder (step SP94) and the "read only" attribute is given to the album sound file (step SP95). After that, in step SP89, the album information file ("Album.inf") is updated, for example, as shown in FIG. 22. FIG. 22 shows a part of the album information file when a copy file of the sound file "Pict0012.wav" is generated as the album sound file "Albm0101.wav".

When the file to be registered is a moving image, the program advances from step SP81 to step SP101. In step SP101, which one of an option of registering only the head frame of a moving image into an album or an option of registering all of frames of a moving image into an album is selected as an album registration file is determined.

In the digital camera 1, a selecting operation regarding such setting can be performed in advance by using a screen as shown in FIG. 23. The screen is displayed on the LCD 5 by selecting the item "setup of camera" in the state ST11, ST21 or ST31 and, in a menu screen displayed by the selection, selecting "registration of moving image file into album". By selecting a desired option of either "only head frame" or "all frames" in the screen with the up and down keys 7*a* and 7*b* and execution button 8*a,* a desired setting state can be obtained.

In step SP101, when it is determined that album registration of only the head frame of a moving image is set, only the head frame of a moving image is extracted (step SP102) and the program advances to step SP84. After that, through steps SP85, SP86, SP87 and SP88, a still image as the head frame of the moving image is registered as an album file in the album folder. After that, in step SP89, the album information file ("Album.inf") is updated, for example, as shown in FIG. 24. FIG. 24 is a diagram showing a part of the album information file when a copy file of the still image of the head frame of the moving image file "Pict0013.avi" is generated as the album image file "Albm0101.jpg" in the album folder.

On the other hand, when it is determined in step SP101 that album registration of all of frames of the moving image is set, a moving image file itself is registered as an album.

Concretely, the digital camera I determines the file name of the new album file (step SP103). To be specific, a file name having a serial number obtained by incrementing the largest serial number in existing album files obtained by referring to the album information file is determined. The moving image file to be registered is copied into an album folder, thereby generating an album moving image file (step SP104). To the new album moving image file, the name determined in step SP103 is given. The file attribute of the album moving image file is set to "read only" (step SP105). After that, in step SP89, the album information file ("Album.inf") is updated, for example, as shown in FIG. 25.

FIG. 25 is a diagram showing a part of the album information file when a copy file of the moving image file "Pict0013.avi" itself is generated as an album moving image file "Albm0101.avi" in the album folder.

In such a manner, various kinds of files can be registered in an album.

As described above, the digital camera 1 is constructed so that an image captured by photographing is stored in a captured file folder in association with the photographing operation. In the case where the operator performs a predetermined operation to store a favorite captured image, an album file corresponding to the captured file stored in the captured file folder is stored in an album folder in an area different from the captured file folder.

Since the file attribute of the album file is set as "read only" attribute at the time of registration to the album folder, each album file is protected so that data can be prevented from being changed or deleted due to an erroneous operation or the like. The protection which is set for the album file can be canceled as will be described later.

In the case where the album file is protected, in the album reproduction mode, a screen is displayed so as to clearly indicate that data deletion and modification to the file is inhibited (the file is in the protected state). For example, as shown in FIG. 26, an album image or the like is displayed in the state ST30 in the album reproduction mode and a mark MK4 is overlaid on an album image or the like in an upper right part in the screen. The mark MK4 indicates that the album file to be reproduced is protected. By the mark MK4, the operator can easily determine that the album file of an image or the like displayed on the LCD 5 is prohibited from being deleted or the like. Not only in the screen of the state ST30 but also in a screen of a state ST31 or the like, a similar mark MK4 is displayed. In any of the states, similar effects can be obtained.

In the embodiment, when the image file associated with a sound file (for example, image file obtained by "voice memo") is designated as an object to be registered in an album, not only the image file but also the sound file associated with the image file is also registered as an album file. Therefore, without requiring an operation of separately registering a sound file, both of the image file and the sound file can be registered as an album file. That is, the operation is easy. When a file associated with another file (for example, an image file obtained by "voice memo") is an object of registration, a file based on the another file (for example, sound file obtained by "voice memo") is also generated as an album file, so that album registering operation is easy.

Also at the time of batch registration, not only an album file based on an image file but also an album file based on a file of sound data or the like associated with the image file are generated. Therefore, files including an associated file can be registered as album files with reliability. Particularly, in the case of album-registering all of files in a predetermined folder by a batch registration operation as described above, all of the files in the predetermined folder including an associated data file can be easily album-registered.

Further, album file association information is managed in a lump in the album information file. Concretely, the album information file includes information of association of album files to files associated with each other, and the overall control unit 50 manages the association information by using the album information file. Since the information of association among album files is managed by using the album information file as described above, as compared with the case of managing the association information only on the album file unit basis, the information is well-organized and is easily managed.

In the case where the option of album-registering only the head frame of a moving image is selected in FIG. 23, a still image file corresponding to a predetermined frame (in this case, the head frame) in the moving image file is generated as an album file corresponding to the moving image file. In this case, as compared with the case of album-registering the whole moving image file as an album file, the file capacity (data size) can be suppressed.

Protection of Data Stored in Captured File Folder

Protection of a captured file stored in a captured file folder will now be described.

As described above, image data or sound data obtained by photographing or recording is stored as a captured file to which archive attribute is given in association with photographing or recording into a captured file folder. In other words, a captured file obtained by photographing or recording is stored in a captured file folder in a state where data modification and deletion is permitted. Consequently, there is the possibility that a captured file is easily deleted by erroneous operation or the like.

In order to prevent such a situation, the digital camera 1 can protect also a captured file stored in a captured file folder on the basis of a protection setting operation by the user.

Figure 27:
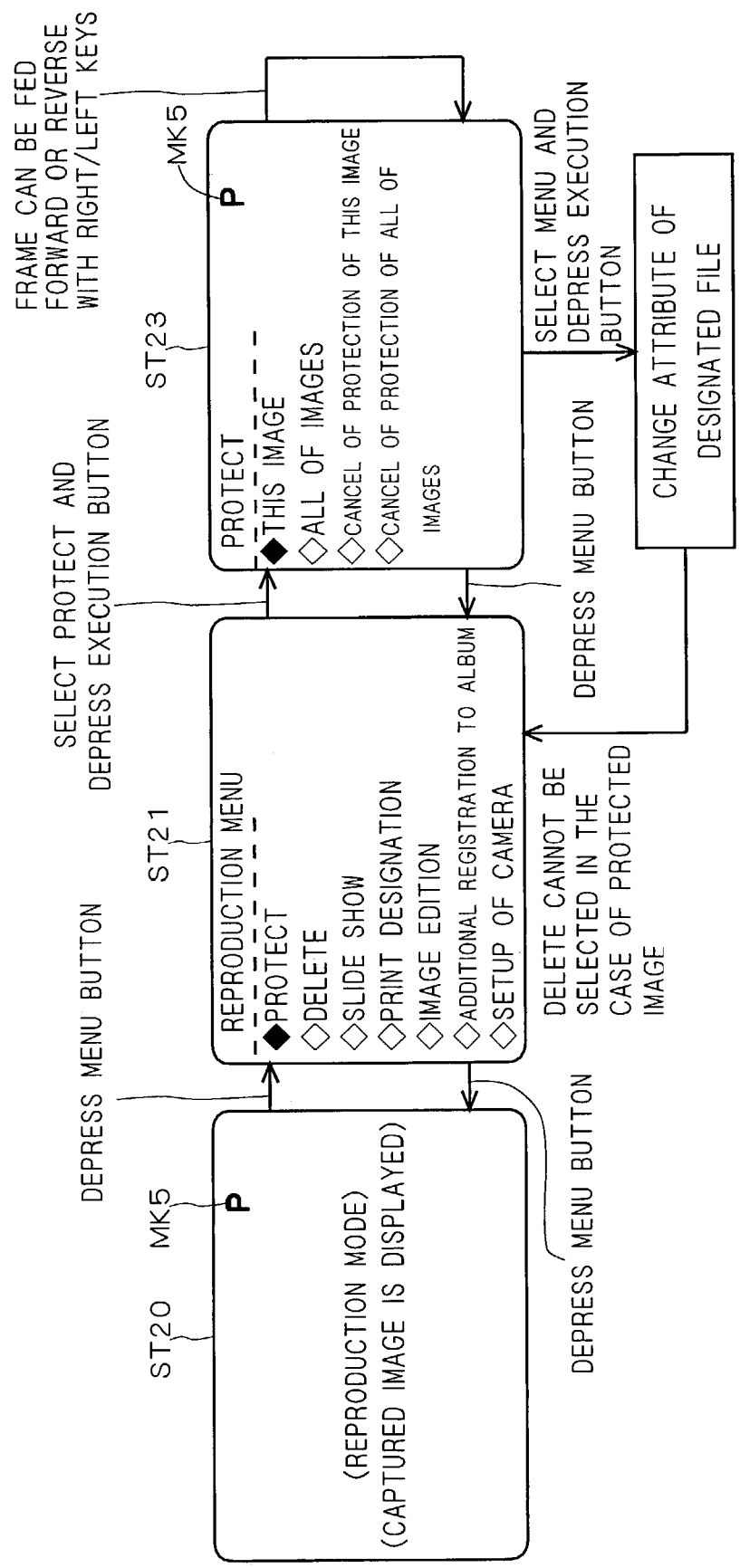
FIG. 27 is a diagram showing a state transition in the case where a protection for a captured image file is setting.

FIG. 27 is a diagram of a state transition in the digital camera 1 and shows a state transition in the case of protecting a captured file by mainly illustrating a change in the display state in the LCD 5. As shown in FIG. 27, when the user depresses the menu button 8b in the state ST20 in which a captured image or the like is displayed on the LCD 5 in the reproduction mode, the reproduction menu screen is displayed and the program shifts to the state ST21. When the operator selects the item of "protect" from options of the reproduction menu displayed on the LCD 5 and depresses the execution button 8a, the digital camera 1 shifts to the state ST23.

In the protecting operation screen shown in the state ST23, as option items, four items of "this image", "all images", "cancel of protection of this image" and "cancel of protection of all of images" are displayed. "This image" is an option item for setting protection on an image or the like to be reproduced, which is displayed as a background at that time point. "All images" is an option item for setting protection on all of captured files stored in a captured file folder in a lump. "Cancel of protection of this image" is an option item for canceling the setting of protection on the image or the like to be reproduced, which is displayed as a background at that time point. Further, "cancel of protection of all of images" is an option item for canceling protection on all of captured files stored in a captured file folder.

When the user selects one of the option items and depresses the execution button 8a, the file attribute AT of the designated captured file is changed and the digital camera 1 returns to the state ST21. For example, when the protection setting operation is selected, the file attribute of the captured file selected is changed from "archive attribute" to "read only attribute". When the setting of protection of the captured file is made, to show that the image or the like to be reproduced is protected, a mark MK5 is displayed in a part of the screen (see FIG. 27). By the indication of the mark MK5, the user can easily determine that the captured file of the image displayed on the LCD 5 is prohibited from being deleted.

Deletion of Data Registered in Album

The case of deleting an album file registered in an album folder will now be described.

As already described above, when a file stored in a captured file folder by photographing or recording is registered in an album folder by an album registering operation, the album file is protected at the time point, so that the album file stored in the album folder cannot be deleted.

Consequently, in the case of deleting an album file, first, a process of canceling protection which is set on the album file has to be performed. The cancellation of protection can be executed when the operator performs an operation of canceling protection.

Figure 28:
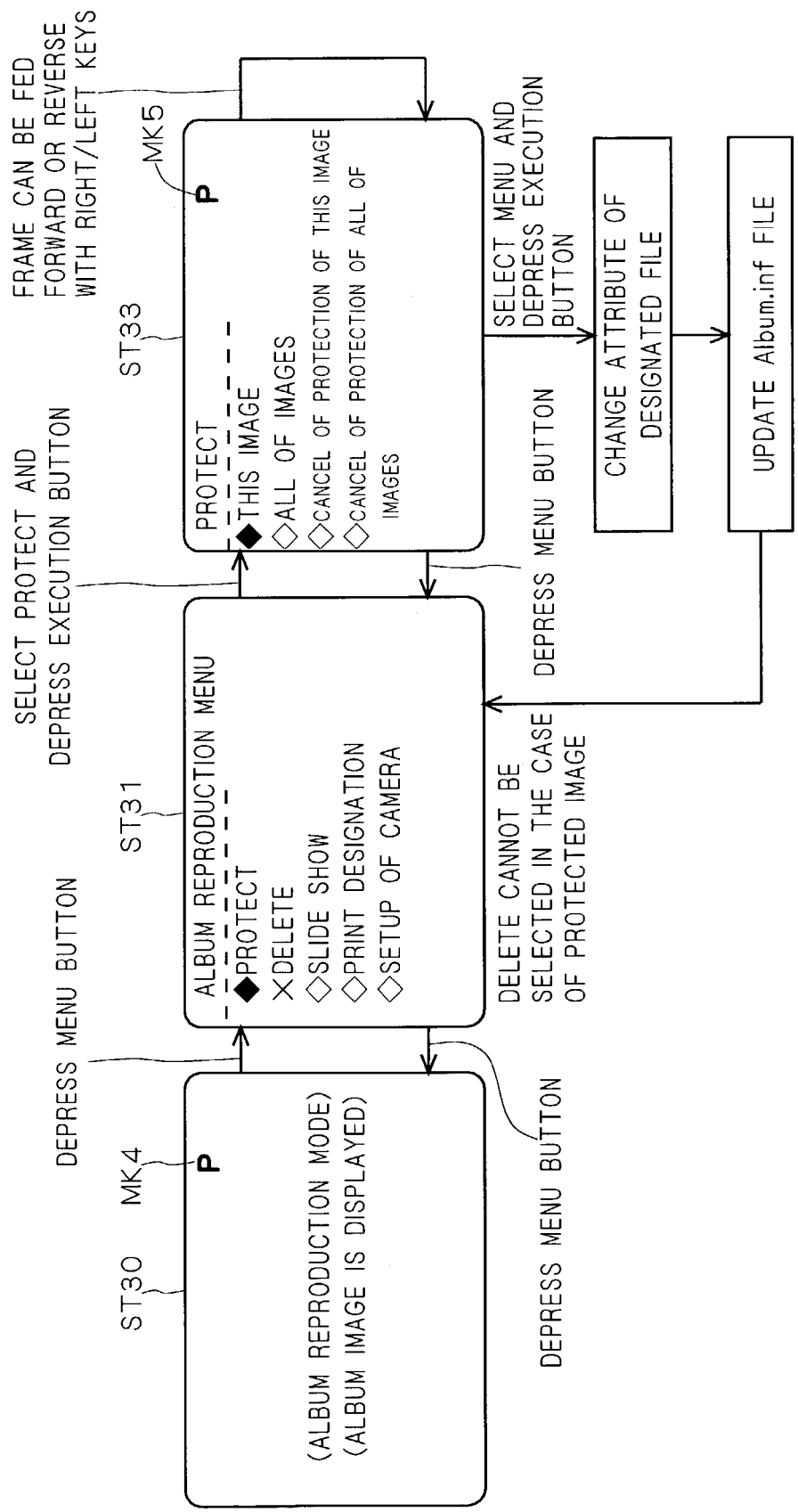
FIG. 28 is a diagram showing a state transition in the case of changing a setting state of protection on an album file.

FIG. 28 is a diagram showing a state transition in the digital camera 1 and shows the state transition in the case of changing a protection set state on the album file by mainly illustrating a change in a display state in the LCD 5. As shown in FIG. 28, when the operator depresses the menu button 8b in the state ST30 in which an album image or the like is displayed on the LCD 5 in the album reproduction mode, an album reproduction menu screen is displayed and the digital camera 1 shifts to the state ST31.

In the state ST31, when the album file protection setting is not canceled, the item of "delete" in the album reproduction menu screen is displayed in an unselectable state (x mark is given in FIG. 28), thereby inhibiting deletion of the album file to be reproduced from being selected. When the user selects the item of "protect" in the option items in the album reproduction menu displayed on the LCD 5 and depresses the execution button 8a, the digital camera 1 shifts to the state ST33.

In the protection operation screen shown in the state ST33, as option items, items similar to those for a captured file (see the state ST23 in FIG. 27) are displayed. Specifically, the four items of "this image", "all of images", "cancel of protection of this image" and "cancel of protection of all of images" are displayed. The items are similar to those in the case of setting protection on a captured file. Therefore, when the operator desires to cancel protection on one album file displayed as a background image or the like on the LCD 5, the user selects "cancel of protection on this image". When the user desires to cancel the protection of all of album files stored in an album folder in a lump, the user selects "cancel of protection of all of images". After that, the execution button 8a is depressed, thereby changing the file attribute AT of the album file selected from "read only attribute" to "archive attribute". At this time, the album information file ("Album.inf") stored in the album folder is rewritten.

FIG. 29 is a diagram showing an example of rewriting an album information file. In association with cancellation of protection of the album file (Albm0003.jpg) stored in an album folder, the file attribute AT of the album file (Albm0003.jpg) is changed to the archive attribute and, as shown in FIG. 29, the file attribute shown in the album information file ("Album.inf") is also changed from "read only attribute" to "archive attribute".

After the file attribute is changed, the digital camera 1 changes to the state ST31 and the item of "delete" in the option items in the album reproduction menu is displayed in a selectable state. At this time, the mark MK4 displayed in a part of the screen of the LCD 5 is switched to non-display, so that the user can visually grasp that the protection set on the album file to be displayed is canceled.

By the above operation, the setting of protection on the album file is canceled and the album file of which protection is canceled becomes deletable. In the case of setting protection again on the album file of which protection is canceled once, it is sufficient to perform an operation similar to the protection setting operation on the captured file.

Figure 30:
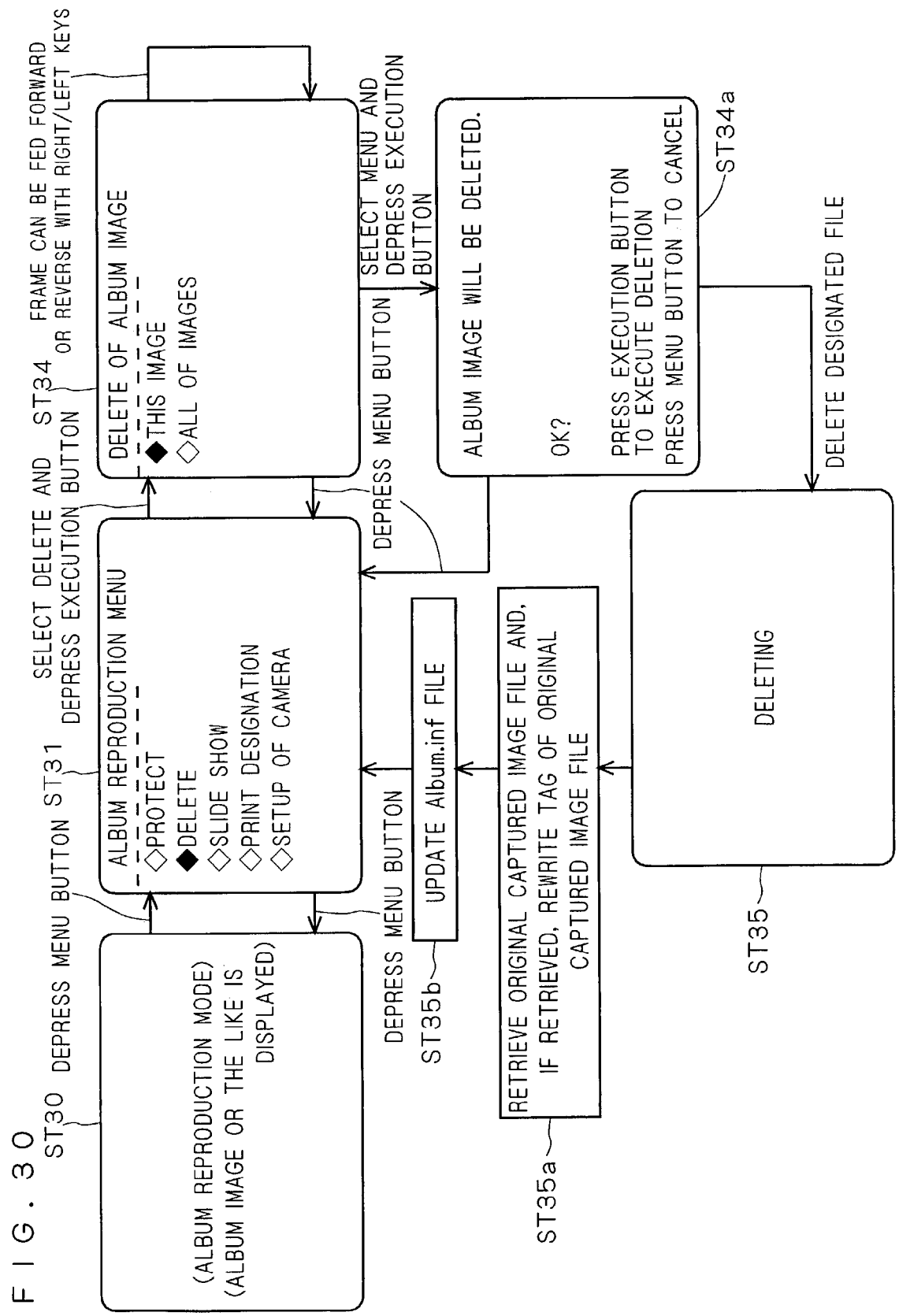
FIG. 30 is a diagram showing a state transition in the case of deleting a protection-canceled album file.

FIG. 30 is a diagram showing a state transition in the digital camera 1 and shows a state transition in the case of deleting an album file of which protection is canceled by mainly illustrating a change in the display state in the LCD 5.

As shown in FIG. 30, in the state ST30 in which an album image or the like is displayed on the LCD 5 in the album reproduction mode, when the operator depresses the menu button 8b, the album reproduction menu screen is displayed and the digital camera 1 shifts to the state ST31. In the state ST31, when the album file protection setting is canceled, the item of "delete" in the album reproduction menu screen is displayed in a selectable state. When the operator selects the item of "delete" from the option items in the reproduction menu displayed on the LCD 5 and depresses the execution button 8a, the digital camera 1 shifts to the state ST34.

In the state ST34, a deleting operation screen with a screen title of "delete of album image" is displayed. By the screen, the user can grasp that an object to be deleted is an album image or the like stored in an album folder. In the deleting operation screen, two items of "this image" and "all of images" are displayed as option items. "This image" is an option item for deleting an image to be reproduced or the like and displayed as a screen background at that time point from an album folder. "All of images" is an option item for deleting all of album files stored in an album folder in a lump.

When the user selects one of the option items and depresses the execution button 8a, a designated album file is determined as an object to be deleted. After that, the digital camera 1 shifts to a state ST34a.

In the state ST34a, a warning indicating that the operator is deleting an album file is displayed on the LCD 5. When the operator depresses the menu button 8b while the warning is displayed, the selected album file is not deleted and the digital camera 1 returns to the state ST31. On the other hand, when the operator depresses the execution button 8a while the warning is displayed, the digital camera 1 shifts to a state ST35 and a process of deleting the selected album file is executed. The warning is indicated in the state ST34a in order to prevent the album file from being deleted by an erroneous operation or the like. By urging the user to perform another input operation in the warning indication, the album file is prevented from being erroneously deleted.

In the state ST35, a message indicating that the album file is being deleted is displayed on the LCD 5 and a designated album file is deleted from the album folder. At this time, the overall control unit 50 specifies the original captured file of the album file to be deleted by referring to the album information file and determines whether the captured file as a registration source exists in the captured file folder or not. When the captured file as a registration source exists, the tag information TG of the captured file as a registration source is rewritten (state ST35a). Concretely, information regarding "presence/absence of album registration" in the tag information TG is rewritten from "presence" to "absence". Information regarding an album file to be deleted is deleted from the album information file ("Album.inf") (state ST35b), and the digital camera 1 returns to the state 31.

By the above operation, deletion of the album file stored in the album folder in association with the registration operation is completed.

A case of deleting a captured file stored in the captured file folder will now be described. To a captured file stored in the captured file folder, as a rule, an archive attribute is given. In the case of setting protection to the captured file by the operator, in a manner similar to the case of the album file, an operation of canceling the protection is performed prior to the deleting operation. After canceling the protection, the captured file becomes deletable.

Figure 31:
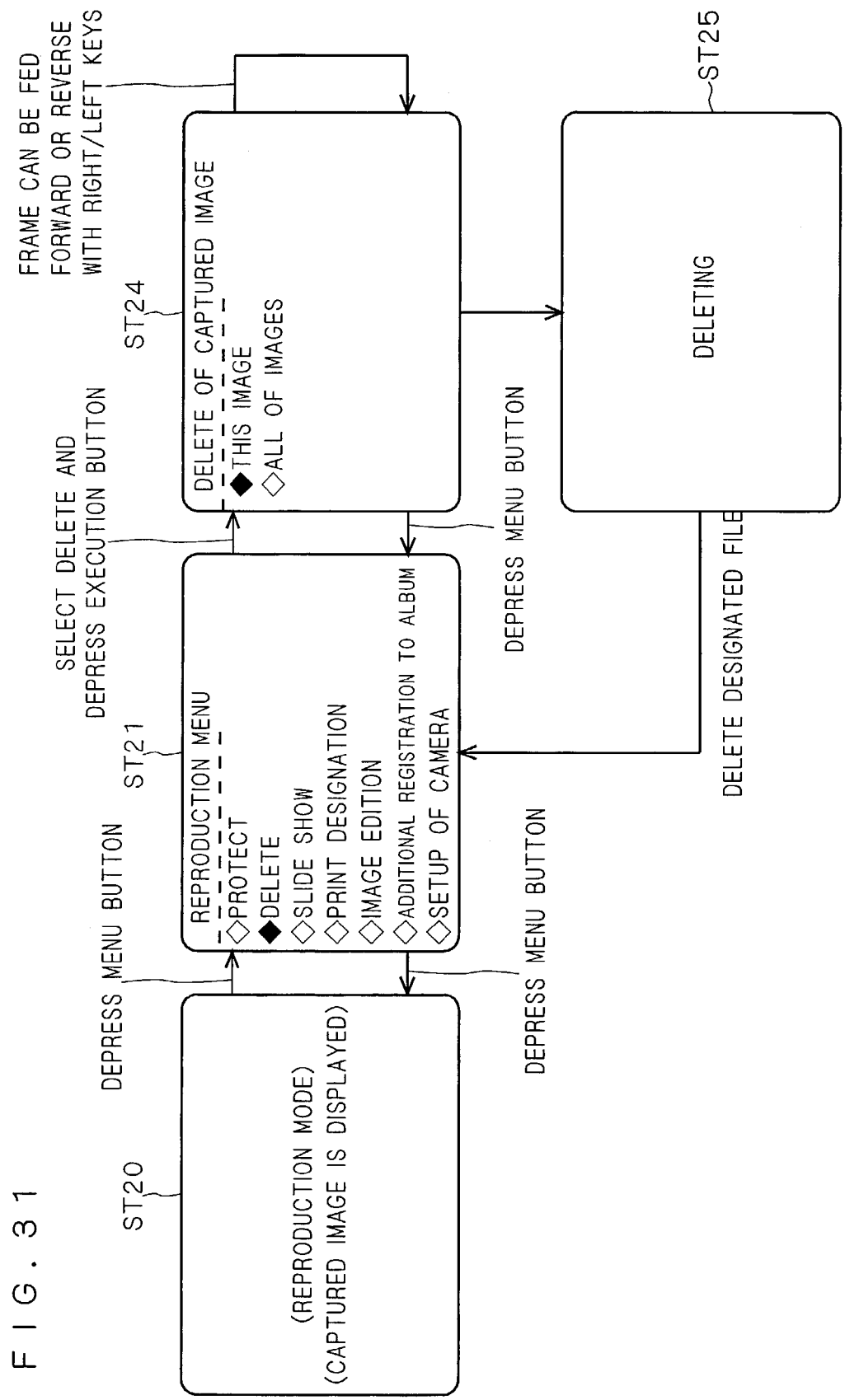
FIG. 31 is a diagram showing a state transition in the case of deleting a captured image file to which protection is not set.

FIG. 31 is a diagram showing a state transition in the digital camera 1 and shows a state transition in the case of deleting a captured file to which protection is not set by mainly illustrating a change in the display state in the LCD 5. As shown in FIG. 31, in the state ST20 in which a captured image or the like is displayed on the LCD 5 in the reproduction mode, when the user depresses the menu button 8b, the reproduction menu screen is displayed and the digital camera 1 shifts to the state ST21. In the state ST21, in the case where the protection is not set to the captured file, the item of "delete" in the reproduction menu screen is displayed in a selectable state. When the operator selects the item of "delete" from the option items in the reproduction menu displayed on the LCD 5 and depresses the execution button 8a, the digital camera 1 shifts to the state ST24.

In the state ST24, a deleting operation screen with a screen title of "delete of captured image" is displayed. By the screen, the user can grasp that an object to be deleted is a captured image or the like stored in a captured file folder. In the deleting operation screen, two items of "this image" and "all of images" are displayed as option items. The items are similar to those in the case of deleting an album file (see the state ST34 in FIG. 30). When the operator selects one of the option items and depresses the execution button 8a, a designated captured file is determined as an object to be deleted. After that, the digital camera 1 shifts to the state ST25, a message indicating that the captured file is being deleted is displayed on the LCD 5, and the designated captured file is deleted from the captured file folder. After completion of the deleting process, the digital camera 1 returns to the state ST21.

By the above operations, deletion of the captured file captured and stored in the captured file folder is completed.

As described above, the digital camera I displays a screen with a title at the time of deleting a file stored in the memory card 90 so that the file to be deleted can be clearly recognized as a captured file or album file. Thus, the possibility that the album file is deleted erroneously can be reduced.

Particularly, in the case where a deletion instruction is given to an album file, a warning (for example, the state ST34a in FIG. 30) which is not displayed in the case of a captured file is displayed. Consequently, the object to be deleted can be easily recognized as an album file at the stage of the warning indication, so that the album file can be prevented from being deleted by erroneous operation or the like of the operator. Specifically, when the same screen display format is employed for both of the case where the file to be deleted is a captured file and the case where the file to be deleted is an album file, there is the possibility that the operator deletes the album file by mistake when he/she intends to delete the captured file. In the case of deleting an album file, by performing display different from the case of deleting a captured file, an album file can be prevented from being unintentionally deleted.

The album file is protected at the time of registration. At the time of deleting or changing the album file, the operation of canceling the protection is necessary. It also can prevent that an album file is unintentionally deleted or changed.

When the album file deleting process is executed, the album file selected from the album folder is deleted. The album file deleted from the album folder may be moved to another folder (for example, a specific folder such as the Trash folder). By storing the deleted file in another specific folder, the file deleted by erroneous operation or the like can be re-used, so that it is useful from the viewpoint of file protection. Also at the time of deleting a captured file, the file may be moved to a specific folder.

Others

Although the embodiment of the present invention has been described above, the present invention is not limited to the above.

For example, in the foregoing embodiment, the case of registering "all" of files in the captured file folder has been described with reference to FIG. 11 and the like, but the present invention is not limited to the case. For instance, only a plurality of files designated by the user out of all of files in the captured file folder may be album-registered in a lump.

Concretely, first, a screen (not shown) for designating an album registration object is displayed on the LCD 5. In the screen, thumbnail images of images in the captured file folder and check boxes corresponding to the respective thumbnail images are displayed. By marking a checkbox corresponding to an image to be registered, the file to be album-registered is designated. After that, in response to a predetermined batch registration instruction input (for example, depression of the execution button 8a), the batch registration operation on the plurality of files designated is realized. In this case as well, as compared with the case of performing album registration by repeating a set of the operations of designating one file at a time and depressing the execution button 8a and the like, a plurality of files can be album-registered more easily.

In the embodiment, the case of storing an album image in the memory card 90 has been described. The present invention is not limited to the case but an album image may be stored in a built-in memory of the digital camera.

While the invention has been shown and described in detail, the foregoing description is in all aspects illustrative and not restrictive. It is therefore understood that numerous modifications and variations can be devised without departing from the scope of the invention.

What is claimed is:

1. An image capturing apparatus comprising:
   an image generator for generating image data;
   a first data file generator for generating a first data file including image data generated by said image generator;
   a second data file generator for generating a second data file different from said first data file on the basis of said first data file;
   a display for displaying various images; and
   a switch, wherein each activation of said switch directly causes said image capturing apparatus to cycle, in a predetermined order, through displaying:
   an image based on image data generated by said image generator,
   an image based on image data included in said first data file, and
   an image based on image data included in said second data file,
   wherein said image capturing apparatus only displays an image based on the image data included in said first data file when said first data file is recorded in a recording medium to which each of said first and second data files is recorded, and automatically displays a next image in said predetermined order otherwise.

2. The image capturing apparatus according to claim 1, further comprising:
   a recorder for recording sound data, wherein
   each of said first and second data files includes sound data.

3. The image capturing apparatus according to claim 1, wherein said image capturing apparatus displays an image based on the image data included in said second data file only when said second data file is recorded in a recording medium to which each of said first and second data files is recorded, and automatically displays a next image in said predetermined order otherwise.

4. The image capturing apparatus according to claim 1, wherein said display can display a menu screen regarding image reproduction, and said menu screen includes an identification display which indicates whether said menu screen is a menu screen for the image data included in said first data file or a menu screen for the image data included in said second data file.

5. The image capturing apparatus according to claim 4, wherein
the menu screen for the image data included in said first data file and the menu screen for the image data included in said second data file include items which coincide with each other.

6. The image capturing apparatus according to claim 5, wherein
each of the menu screen for the image data included in said first data file and the menu screen for the image data included in said second data file has a hierarchical structure.

7. The image capturing apparatus according to claim 1, wherein
an image based on the image data generated by said image generator is a live view image.

8. The image capturing apparatus according to claim 1, wherein
said first data file and said second data file are respectively stored in different folders in a recording medium.

9. The image capturing apparatus according to claim 1, wherein
the image data included in said first data file and the image data included in said second data file are substantially the same image data.

10. A method of reproducing an image for a digital camera, comprising the steps of:
a) generating image data;
b) generating a first data file including the image data generated in the step a);
c) generating a second data file different from said first data file on the basis of said first data file;
d) detecting operation of a switch; and
e) changing, directly in response to detecting operation of said switch, said image on said display, the displayed image advancing in a predetermined cyclic order among:
an image based on said generated image data,
an image based on image data included in said first data file,
an image based on image data included in said second data file,
wherein detecting operation of said switch after displaying an image based on data included in said second data file causes the cycle to automatically return to displaying an image based on said generated image data without displaying an image based on image data included in said first data file.

11. A digital camera comprising:
a sensor for providing image data;
a memory capable of storing a plurality of a first type of image and a plurality of a second type of image;
a display operable to display an image from said image data when in a first state, to display an image from said plurality of the first type of image when in a second state, and to display an image data from said plurality of the second type of image when in a third state; and
a switch;
wherein a first operation of said switch causes said display to change from said first state to said second state, a second operation of said switch causes said display to change from said second state to said third state, and a third operation of said switch causes said display to change from said third states to said first state without passing through said second state.

12. A digital camera according to claim 11, wherein the display is operated in the second state only if there is at least one of the first type of images stored in the memory.

13. A digital camera according to claim 12, wherein the display is operated in the third state only if there is at least one of the second type of images stored in the memory.

14. A digital camera according to claim 11 wherein the said images of the second type are not automatically erased when transferred to a computer.

15. A digital camera according to claim 11, wherein the memory includes a hierarchical data structure, and wherein the first type of images are stored in a different portion of the hierarchy than the second type of images.

16. A method of operating a digital camera having a sensor for providing image data, a memory capable of storing a plurality of image files categorized as album image files and non-album image files, and a display for displaying an image, the camera being operable in a first mode for displaying images based on the image data from the sensor, a second mode for displaying images from non-album image files, and a third mode for displaying images from album image files, the method comprising:
a) operating the camera in a first mode;
b) detecting activation of a first switch;
c) changing to the second mode responsive to a detected activation of said first switch, if a non-album image file is not stored in the memory automatically proceeding to step e;
d) detecting activation of the first switch;
e) changing to the third mode responsive to a detected activation of said first switch, if an album image file is not stored in the memory, automatically returning to step a
f) detecting activation of said first switch; and
g) returning to step a responsive to a detected activation of said first switch.

17. A method of operating a digital camera according to claim 16, further comprising:
detecting activation of a second switch when displaying an image from a first image file; and
displaying, responsive to activation of said second switch, an image from a second image file, wherein said second image file is the same type of image file as the first image file.

* * * * *